United States Patent [19]

Klashka et al.

[11] Patent Number: 4,803,623
[45] Date of Patent: Feb. 7, 1989

[54] UNIVERSAL PERIPHERAL CONTROLLER SELF-CONFIGURING BOOTLOADABLE RAMWARE

[75] Inventors: John A. Klashka, North Andover; Sidney L. Kaufman, Stoughton; Krzysztof A. Kowal, Framingham, all of Mass.; Richard P. Lewis, Sandown, N.H.; Susan L. Raisbeck, Chelmsford; John L. McNamara, Jr., Tewksbury, both of Mass.

[73] Assignee: Honeywell Bull Inc., Minneapolis, Minn.

[21] Appl. No.: 925,431

[22] Filed: Oct. 31, 1986

[51] Int. Cl.[4] .............................................. G06F 13/10
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,191,996 | 3/1980 | Chesley | 364/200 |
| 4,400,778 | 8/1983 | Vivian et al. | 364/200 |
| 4,491,916 | 1/1985 | Vallhonrat | 364/200 |
| 4,562,533 | 12/1985 | Hodel et al. | 364/200 |
| 4,701,845 | 10/1987 | Andreasen et al. | 364/200 |

Primary Examiner—Thomas M. Heckler
Assistant Examiner—Debra A. Chun
Attorney, Agent, or Firm—John S. Solakian

[57] ABSTRACT

In a computer system having at least a bus with at least one central processing unit (CPU), one random access memory (RAM), and a first configuration of a plurality of different types of peripheral units (e.g. tape drives, disk drives, diskette drives, printers, unit record peripherals, etc.) coupled to the bus, an apparatus for controlling the first configuration and also capable of controlling a predetermined number of other configurations of different types of peripheral units when any of that predetermined number of configurations of peripheral units is coupled to the bus.

15 Claims, 20 Drawing Sheets

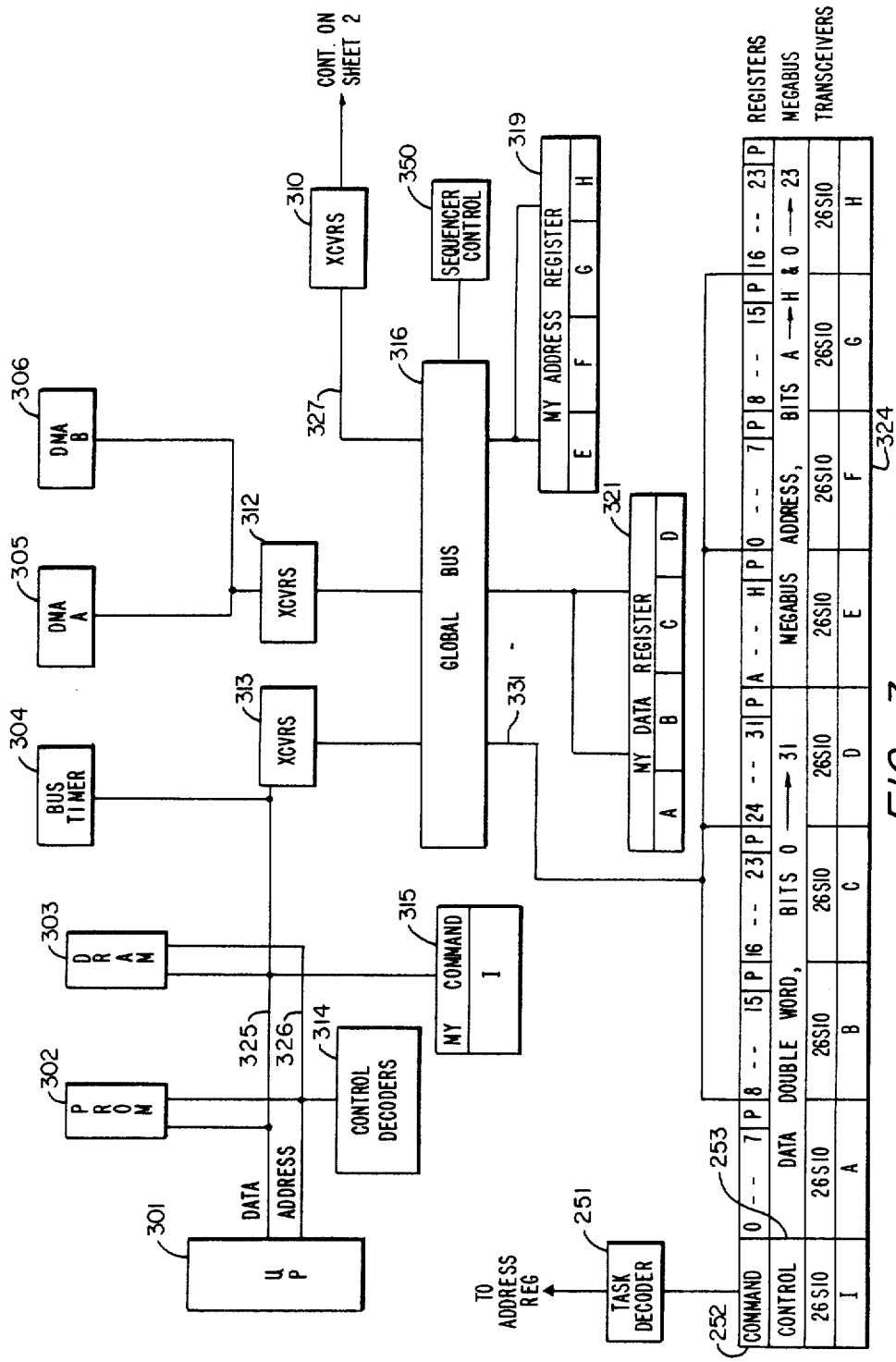
FIG. 3 SHEET 1 OF 2

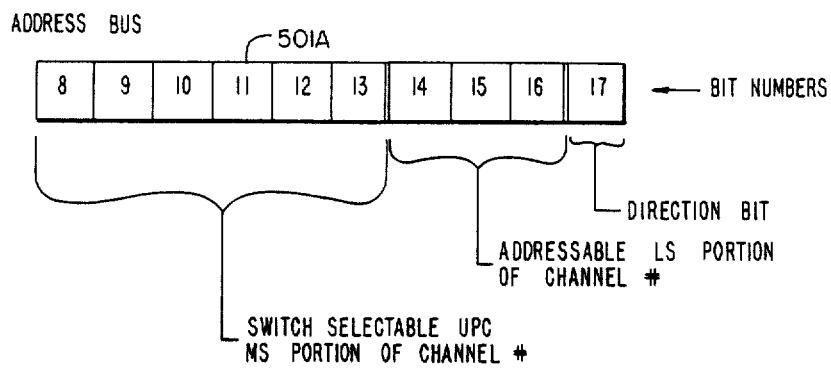
FIG. 5A
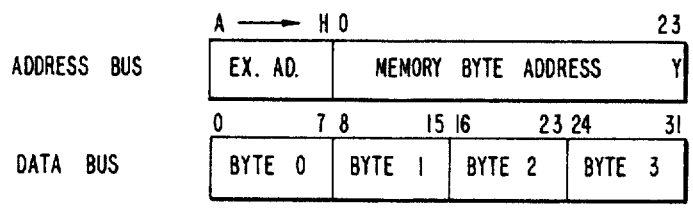
FIG. 5B
FIG. 5C
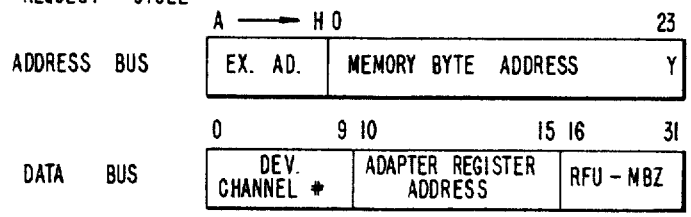
FIG. 5D
FIG. 5E
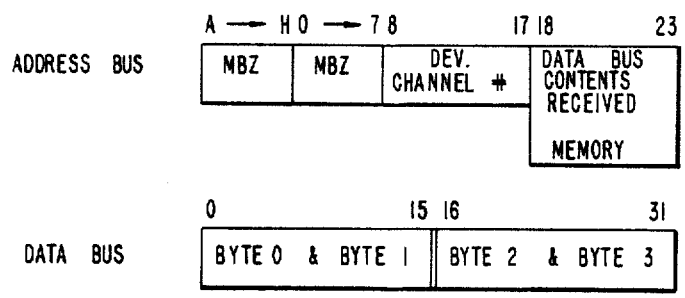
FIG. 5F
FIG. 5G SHEET 1 of 2

OUTPUT CONTROL WORD

INPUT LSW OF THE MEMORY BYTE ADDRESS
REQUEST CYCLE

RESPONSE CYCLE

INPUT RANGE
REQUEST CYCLE
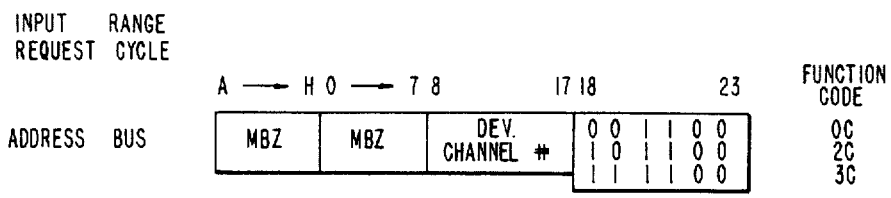
FIG. 6Q
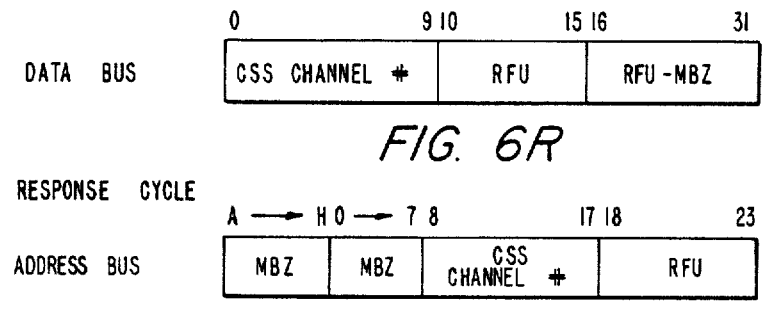
FIG. 6R
FIG. 6S
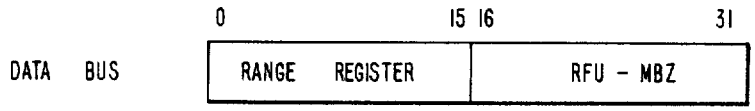
FIG. 6T

INPUT CONFIGURATION WORDS A,B,C OR D
REQUEST CYCLE

RESPONSE CYCLE

RAMWARE LOAD STATUS
REQUEST CYCLE

ADDRESS BUS

DATA BUS

RESPONSE CYCLE

ADDRESS BUS

DATA BUS

INPUT ADAPTER RAMWARE/HARDWARE REVISION
REQUEST CYCLE

RESPONSE CYCLE

INPUT UPC RAMWARE/HARDWARE REVISION

REQUEST CYCLE

RESPONSE CYCLE

INPUT UPC CHANNEL CONFIGURATION
REQUEST CYCLE

RESPONSE CYCLE

4,803,623

UNIVERSAL PERIPHERAL CONTROLLER SELF-CONFIGURING BOOTLOADABLE RAMWARE

RELATED CASES

The following patent applications, which are assigned to the same assignee as the instant application, are incorporated herein by reference:

1. System Management Apparatus for a Multiprocessor System, invented by George J. Barlow, Elmer W. Carroll, James W. Keeley, Wallace A. Martland, Victor M. Morganti, Arthur Peters and Richard C. Zelley, Ser. No. 869,164, filed May 30, 1986.

2. Multiple DMA Controller Chip Sequencer, invented by Richard P. Lewis and John A. Klashka, Ser. No. 925,344, filed Oct. 31, 1986, now abandoned.

BACKGROUND OF THE INVENTION

1. Field of the Invention

This invention relates generally to data processing systems having data processing operations provided over a common input/output bus, and more particularly with a universal peripheral controller for controlling various types and numbers of peripherals coupled to the bus.

2. Description of the Prior Art

Many data processing systems include a common bus to which a plurality of units are connected for the transfer of information. The bus permits any two units to communicate with each other at a given time via a common (shared) signal path. Any unit wishing to communicate, requests the bus cycle. When that bus cycle is granted, that unit becomes the master and may address any other unit in the system as the slave. Most transfers are in the direction of a master to a slave. Some types of bus interchange require a response cycle (read memory, for example). In cases where a response cycle is required, the requester assumes the role of the master, indicates a response is required, and identifies itself to the slave. When the required information becomes available (depending on slave response time), the slave now assumes the role of the master and initiates a transfer to the requesting unit. This completes the interchange which has taken two bus cycles. Intervening time on the bus between these two cycles may be used for other system traffic not involving these two units.

A master may address any other unit on the bus as a slave. It does this by placing the slave address on the address leads. There may be 24 address leads, for example, which can have either of two interpretations depending on the state of an accompanying control lead, called the memory reference cycle. In essence when the memory is being addressed, the bus enables up to $2^{24}$ bytes to be directly addressed to memory. When units are passing control information, data or interrupts, they address each other by a channel number. The channel number allows up to $2^{10}$ channels to be addressed by the bus. Along with the channel number a 6 bit function code is passed which specifies which up to $2^6$ possible functions this transfer implies.

A typical prior art data processing system utilizing a bus is shown on FIG. 1. A multiline bus 100 coupled with memory 102 to memory 104, such memories having the highest priority and with the central processor 106 having the lowest priority. Also connected on the bus may be included, for example, a scientific-arithmetic unit 108 and various controllers 110, 112, 114. Controller 110 may be coupled to control, for example, 4 unit record peripheral devices 116. Controller 112 may be used to provide communication control via modem devices; whereas controller 114 may be utilized to control mass storage devices, such as a tape peripheral device 118 or a disk peripheral device 120. Any one of the devices coupled with the bus 100 may address a memory or any other unit connected to the bus. Thus tape peripheral 118 may, via controller 114, address memory 102. Each of such units directly connected to the bus includes tie-breaking logic in the event that two units request simultaneous service from the bus further.

A channel number exists for every end point in the particular system with the exception of the memory type processing elements which are identified by the memory address. A channel number is assigned for each such device. Full duplex devices, as well as half duplex devices, utilize two channel numbers. Output only or input only devices use only one channel number each. Channel numbers are easily variable and accordingly one or more hexidecimal rotary switches (thumb wheel switches) may be utilized for each such unit connected with the bus to indicate a set's unit address. Thus when a system is configured, the channel number may be designated for the particular unit connected to the bus, as may be appropriate for that particular system. Units with multiple inputs/outputs generally will require a block of consecutive channel numbers. By way of example, a 4 port unit may use rotary switches to assign the upper 7 bits of a channel number and may use the lower order 3 bits thereof to define the port number to distinguish input ports from output ports. The channel number of the slave unit will appear on the address bus for all non-memory transfers. Each unit compares that number with its own internally stored number (internally stored by means of the rotary switches). The unit which achieves a compare is, by definition, the slave, and must respond to that cycle. Generally, no two points in a single system will be assigned to the same channel number. The function codes may designate output or input operations. All odd function codes designate output transfers (write), while all even function codes designate input transfer requests (read). The central processor examines the least significant bit of a 6 bit function code field for an input/output command and uses a bus lead to designate the direction.

A unique device identification number is assigned to every different type of device which is connected to the bus. This number is presented on the bus in response to the input function command, entitled input device identification.

A unit wishing to interrupt the central processor requests the bus cycle. When this bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt.

In this type of system different units have different priorities in order to obtain bus cycles. For example, the memory has the highest priority and the central processor has the lowest priority, and they reside physically at opposite ends of the bus 100. Other units occupy intermediate positions and have priority which increases relative to their proximity to the memory end of the bus.

More detail is disclosed in regard to the above type of bus system in the following U.S. patents. The subject patents pertain to the proprietary bus system of Honeywell known in the trade as Megabus*.

*Megabus—a trademark of Honeywell Information Systems Inc.

(a) Data Processing System Providing Split-Bus Cycle Operation by Frank V. Cassarino, Jr. et al, issued Dec. 14, 1976, and having U.S. Pat. No. 3,997,896.
(b) Data Processing System Providing Locked Operation of Shared Resources by George J. Barlow et al, issued Dec. 28, 1976, and having U.S. Pat. No. 4,000,485.
(c) Data Processing System Having Distributed Priority Network by George J. Barlow, issued June 14, 1977, and having U.S. Pat. No. 4,030,075.
(d) Data Processing System Having Distributed Priority Network with Logic for Deactivating Information Transfer Requests by George J. Barlow, issued June 20, 1978, and having U.S. Pat. No. 4,096,569.
(e) Apparatus for Processing Data Transfer Requests in a Data Processing System by Frank V. Cassarino, Jr. et al, issued Nov. 23, 1976, and having U.S. Pat. No. 3,993,981. (f) Data Processing System Having a Data Integrity Technique by George J. Barlow, issued Nov. 30, 1976, and having U.S. Pat. No. 3,995,258.

It can be seen that with this hierarchical bus process system and the diversity of peripheral systems attached to the bus by different types of controllers that it was necessary to have a universal peripheral controller which could control different types of devices, and eliminate the necessity of having different controllers for different peripherals.

In substituting one universal peripheral controller for many different types of peripheral controllers, one problem that presents itself is that of adapting itself to handle many types of peripheral configurations. For example, a universal peripheral controller (UPC) may be called to service different systems. For example on FIG. 4 there is shown, for simplicity only, two systems FIG. 4A and FIG. 4B, each with a different peripheral configuration of the invention System A, having a system controller 401A, RAM 402A and central subsystem (CSS) 403A, a bus 404A and 405A, may have several adapters 406A-0, 1, 2, 3 attached to it which the UPC must service. Adapter 0 may have two ¼" tape drives 408A, 409A; adapter 406A-1 may have a printer 411A; adapter 2 may have an IEEE 488 interface device 412A; and adapter 3 may have one diskette drive 413A. System B, also having a system controller 401B, Ram 402B and central subsystem (CSS) 403B, a bus 404B and 405B, may also have adapters 407B-0, 1, 2, 3 attached, but the configuration may be different as follows: adapter 407B-0 may have 4½ tape drives 400B, 408B, 409B, 410B; adapter 1 may have a ¼" tape streamer 413B; adapter 2 may have a diskette drive 411B-1; whereas adapter 3 may have a printer 417B. Similarly the UPC may be attached to other type systems having other configurations of peripherals. A universal peripheral controller (UPC) 406B must be able to service all these various configurations How is this problem to be solved? One possible solution is to have hardware and a ROM that can be loaded once and would contain all possible peripheral configurations to provide service to any configuration of peripheral adapters This, however, would require a large memory space in PROM, together with its attendant logic circuitry, and would be expensive and inefficient.

What was needed therefore was hardware/software hereinafter Ramware* that could change the PROM to conform to the configuration of peripheral adapters actually attached.

*Ramware—a trademark of Honeywell Information Systems Inc.

OBJECTS OF THE INVENTION

It is a primary object of the invention to provide an improved peripheral controller system.

Another major object of the invention is to provide an improved data processing system having an improved bus architecture.

Still another object of the invention is to provide a universal peripheral controller that could be compatible with different computer peripheral configurations.

Yet another object of the invention is to provide a universal peripheral controller that could accommodate the coupling of different types of peripheral devices to the Megabus.

Yet a further object of the invention is to provide a universal peripheral controller that would permit several levels of simultaneity in the transfer of data on the bus.

SUMMARY OF THE INVENTION

These and other objects of the invention are achieved by providing a method and apparatus that maintains in an EPROM a base intelligence that interrogates the currently attached adapters and run the Megabus, and with appropriate request and response instructions seeks out from a computer load device the "personality" (i.e., configuration/Ramware) that corresponds with a specific identification of an adapter coupled to the computer system. This Ramware will be loaded into the corresponding local random access memory (RAM) associated with the physical port of the adapter. The Ramware may be placed into two or more corresponding locations by cloning, thus reducing system configuration time.

BRIEF DESCRIPTION OF THE DRAWINGS

The manner in which the apparatus of the present invention is constructed and its mode of operation can best be understood in the light of the following detailed description, together with the accompanying drawings in which:

FIGS. 6Q-6T, show formats of input range words.

DESCRIPTION OF A PREFERRED EMBODIMENT OF THE INVENTION

Figure 1:
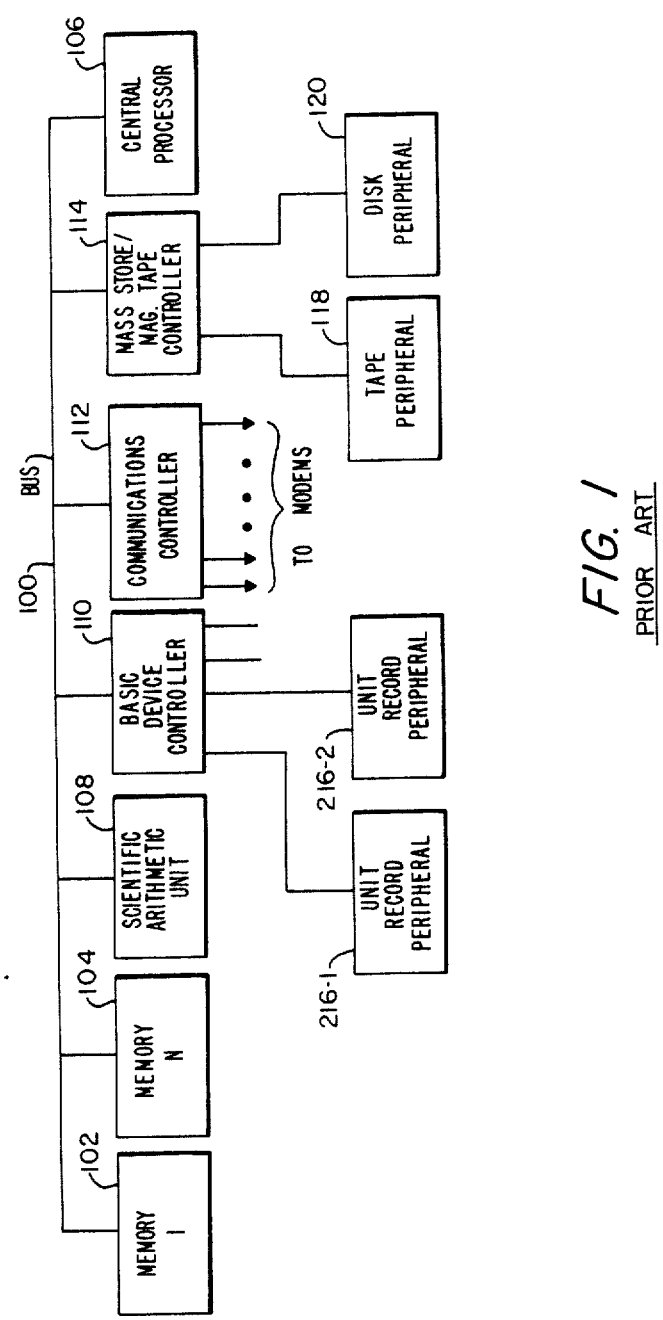
FIG. 1 Is a schematic drawing of a prior art computer system utilizing a bus architecture.
Figure 2:
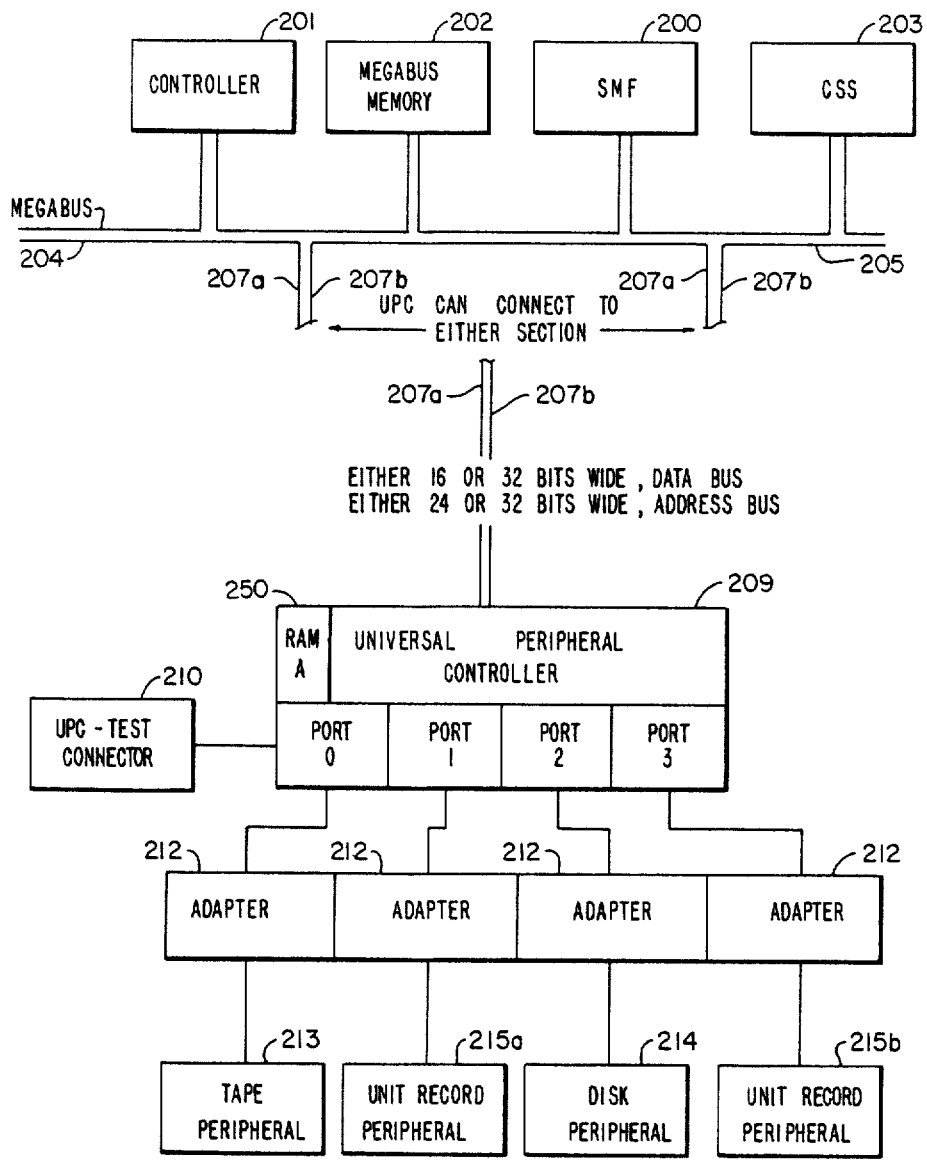
FIG. 2 is a high-level block diagram of the invention.

Referring now to FIG. 2 there is shown a block diagram of the Universal Peripheral Controller Subsystem (UPCS). The UPCS provides a common controller, the universal peripheral controller (UPC) 209 for all Megabus 204, 205 input/output (I/0) configurations with a facility to interface with a variety of peripheral devices.

The UPC permits four simultaneous data transfers as well as peripheral control functions on channels that are not busy. The UPC supports a high priority, low data rate section of the Megabus 204 or a low priority, high data rate section of the Megabus 205 The Megabus can further support either a 16 or 32 bit data bus and either a 24 or 32 address bus.

Shown on FIG. 2 coupled to the Megabus 204, 205 are typically a controller 201 which may be in part the system management hardware (SMF) 200 for which an application assigned to the same assignee as the instant application has been filed (see Related Applications), a Megabus memory 202 and a central subsystem (CSS) 203.

The universal peripheral controller 209 can couple to either the high priority, low data rate section of Megabus 204 via a data bus 207a, which may be either 16 or 32 bits wide and an address bus 207b, which may be either 24 or 32 bits wide to provide an interface assembly enabling any Megabus I/0 configuration to communicate with UPC/adapter connected peripherals. The UPCS further includes up to 4 peripheral adapters 212, each adapter having 2 or more logical channels, for a total of up to 8 logical channels although more channels may be handled by an adapter. Coupled to the adapters via UPC controller 209 are typical peripherals, such as tape peripheral 213, disk peripheral 214 and unit record peripherals 215a, 215b. Although not shown in the Figures supra, all adapters provide some data buffering; i.e., registers, for data rate synchronization and for error detection. Also coupled to the UPC is a test connector 210 which may also be an integral part of the UPC and further includes RAM A 250.

Figure 3:
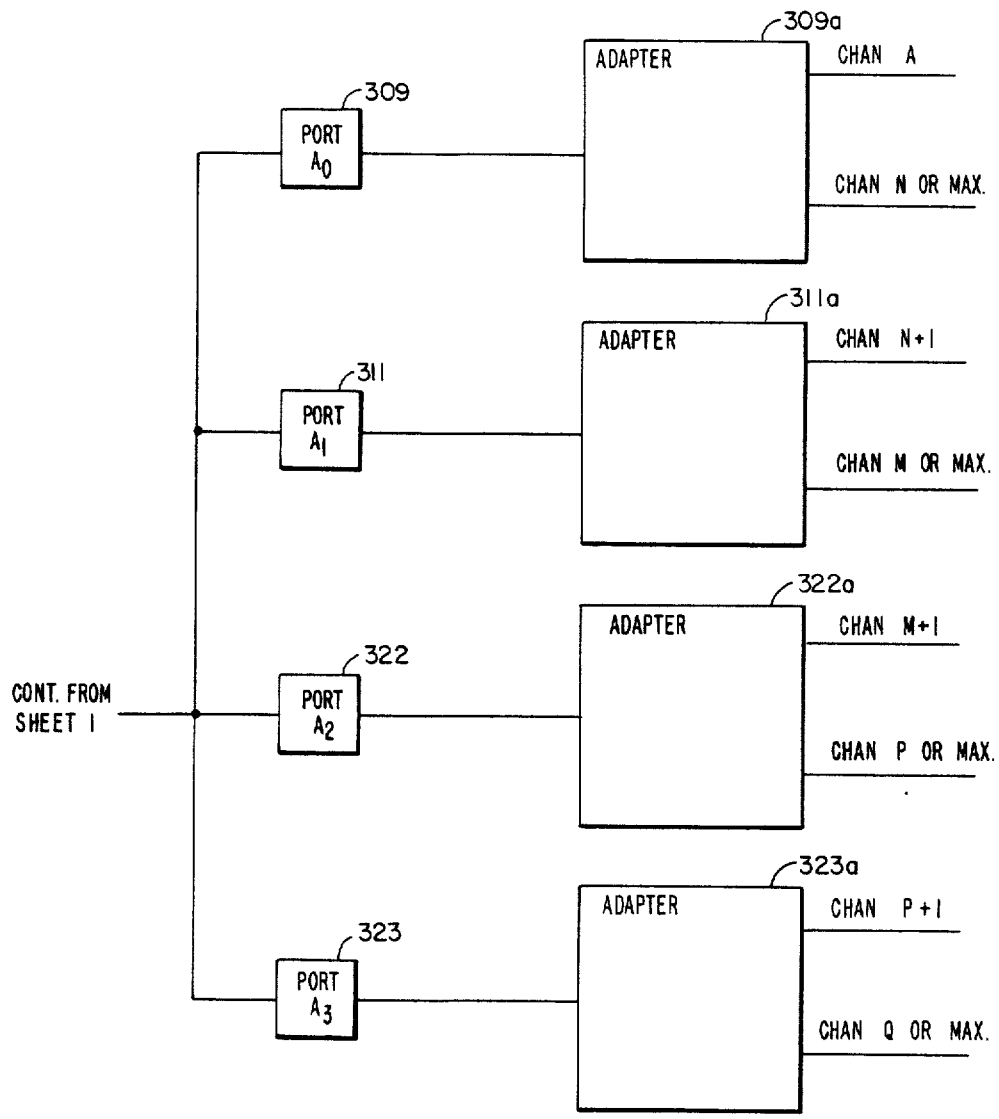
FIG. 3, which consists of 2 sheets, is a more detailed block diagram of the invention.
Figure 4A:
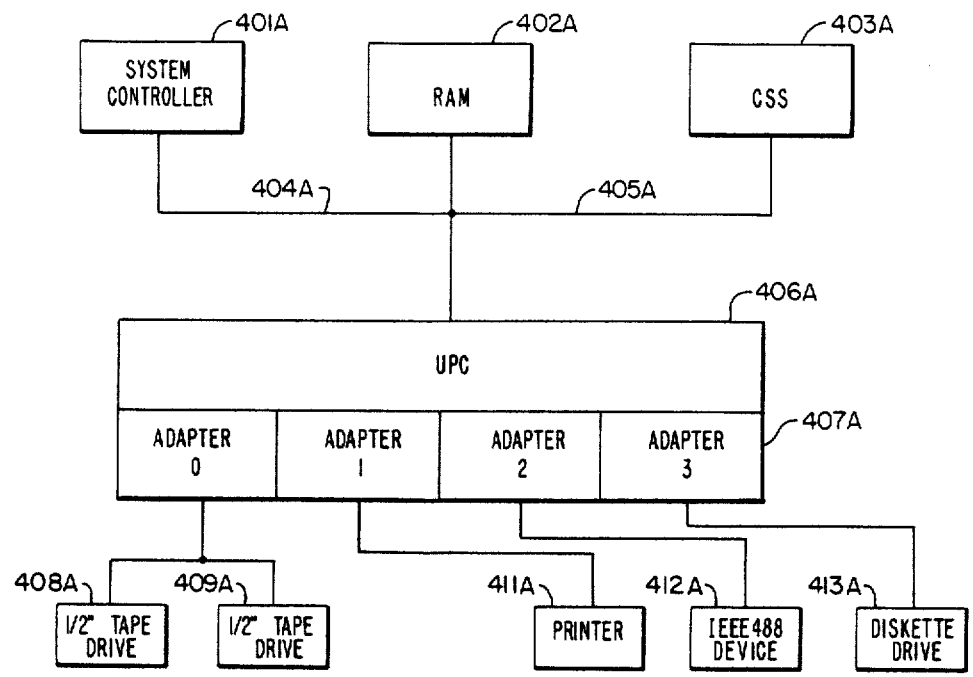
FIGS. 4A and 4B show block diagrams illustrating two configurations capable of being formed with the invention.
Figure 4B:
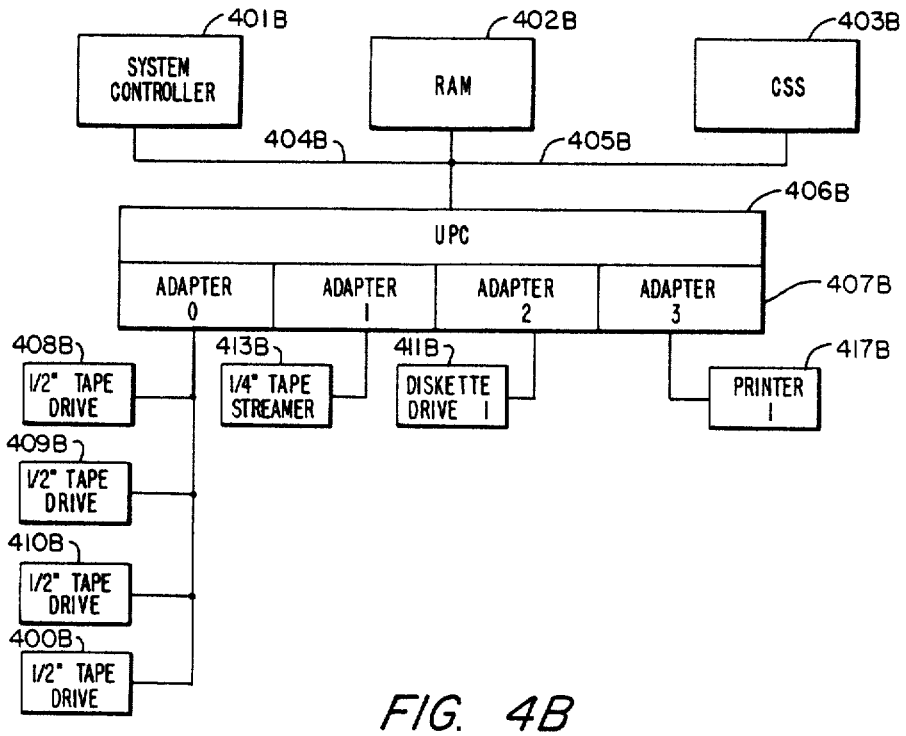

Referring now to FIG. 3 there is shown a more detailed block diagram of the Universal Peripheral Controller. A commercially available Motorola 68000 type microprocessor (μP) 301 is coupled to internal data and address buses 325, 326 respectively. The data bus may be either 16 and 2 parity bits wide; whereas the address bus may be either 24 bits wide. A commercially available PROM 302 is also coupled to the data and address buses 325, 326 and is also coupled to commercially available control decoders 314. A commercially available dynamic random access memory (DRAM) 303 is further coupled to the data and address bus lines 325, 326 and is further coupled to the MY COMMAND register 315. The DRAM 303 may have storage capacity for at least 64K words and is provided with random logic implementation to refresh information stored therein. A bus timer 304 is coupled to the data address bus 325 and provides three functions. The first function is to detect if there is no response to a request for the bus and notify the μP. The second function of the bus timer 304 is to determine if the instruction being executed takes longer than a predetermined value and whether or not it has to abort the execution of the instruction. Finally, the third function of the bus timer 304 is to determine if there is a direct memory access (DMA) request cycle which takes longer than a predetermined period and abort that DMA cycle. A global data and address bus 316 is coupled to data and address lines 325, 326, respectively, via a commercially available transceiver 313. The global data and address bus 316 is further coupled to the interface 324 of the Megabus. Additionally the global data and address bus 316 is coupled to ports 309, 311, 322 and 323, respectively, (see Sheet 2 of FIG. 3) via commercially available transceivers 310 through path 327. Each port 309, 311, 322 and 323, has a respective adapter coupled to it, 309a, 311a, 322a, and 323a. In addition the global data and address bus 316 has MY address register 319 and MY data register 321 coupled to it. These registers 319, 321 each have 4 words each. MY data register 321 has words A, B, C, D, each 8 bits wide plus a parity bit. While MY address register 319 also has 4 words E, F, G, H, each 8 bits wide plus a parity bit. These words and data and address registers 321, 319, respectively, correspond to data and address registers A, B, C, D, and E, F, G, H, located in the Megabus interface 324. Also in the Megabus interface 324 are command registers 252 each having 8 bits including a parity bit, and are each individually and sequentially marked 0-7 P, 8-15 P, etc. Also included in the Megabus interface 324 are commercially available 26S10 type transceivers 253.

Also coupled to the global address and data bus 316 are two typical commercially available DMA chips 305, 306 via transceiver 312.

The gist of the peripheral controller is to have the μP 301 set up the paths for a dialog from a peripheral device requesting service through transceivers 313, global bus 316, Megabus interface 324, transceivers 310, ports 309, 311, 322, 323, and finally through adapters 309a, 311a, 322a, 323a, and on to the specific peripheral devices and to further provide address and range information to the DMA chips 305, 306 via transceiver 313, global bus 316 and transceiver 312. Once the μP has set up the particular dialog between a given peripheral and another device, it turns over the task of actually performing the transfer of information to one of the DMA devices 305, 306, which then controls a round robbin access to global bus 316 from the various ports 309, 311, 322, 323. (See U.S. patent application entitled "Controller Chip Sequencer" by John Klashka et al, assigned to the same assignee as the instant application and filed on the same date as the instant application.)

Figure 5H:
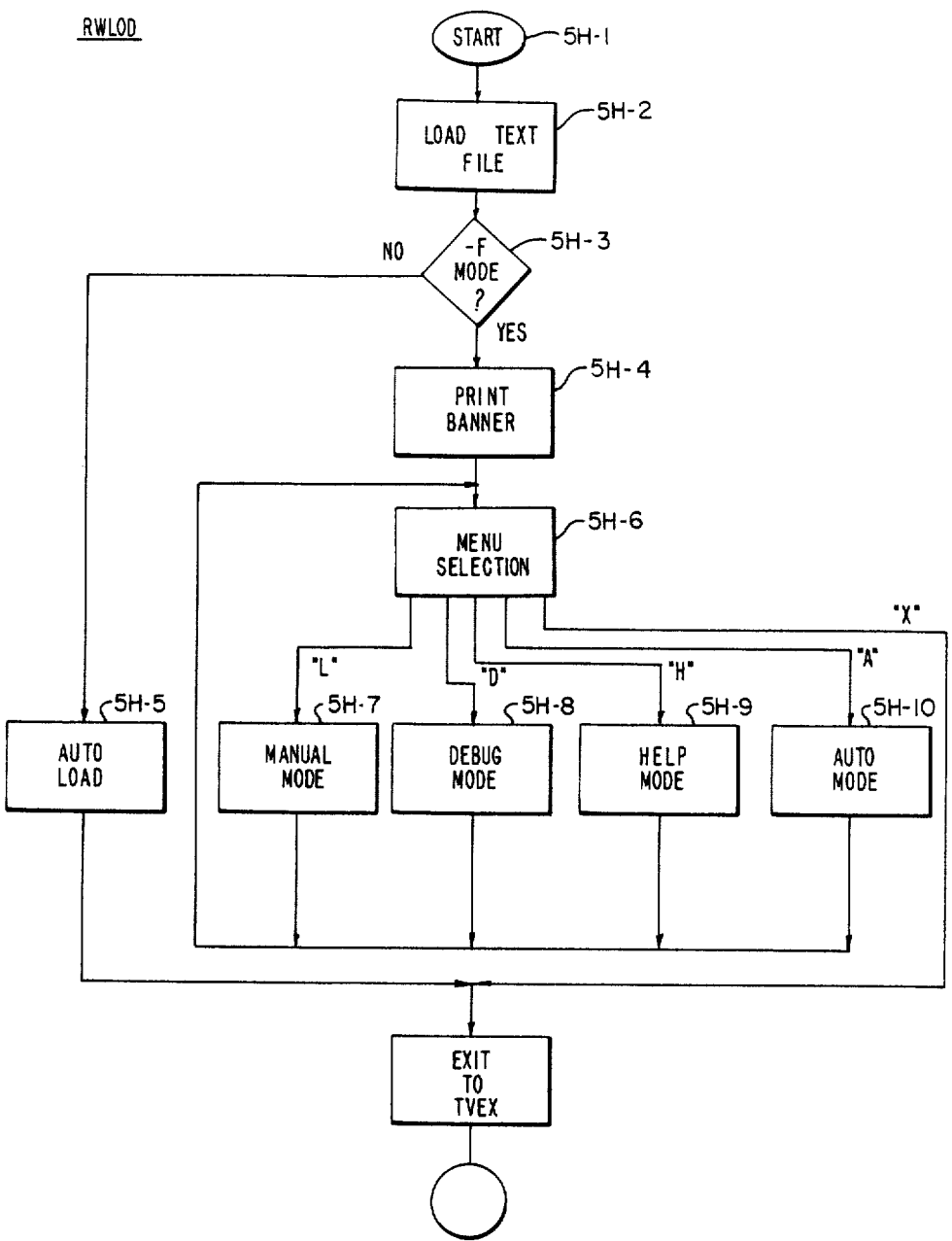
FIGS. 5H, 5I (which consists of 2 sheets), and 5J are flow charts of the utility load program.
Figure 51:
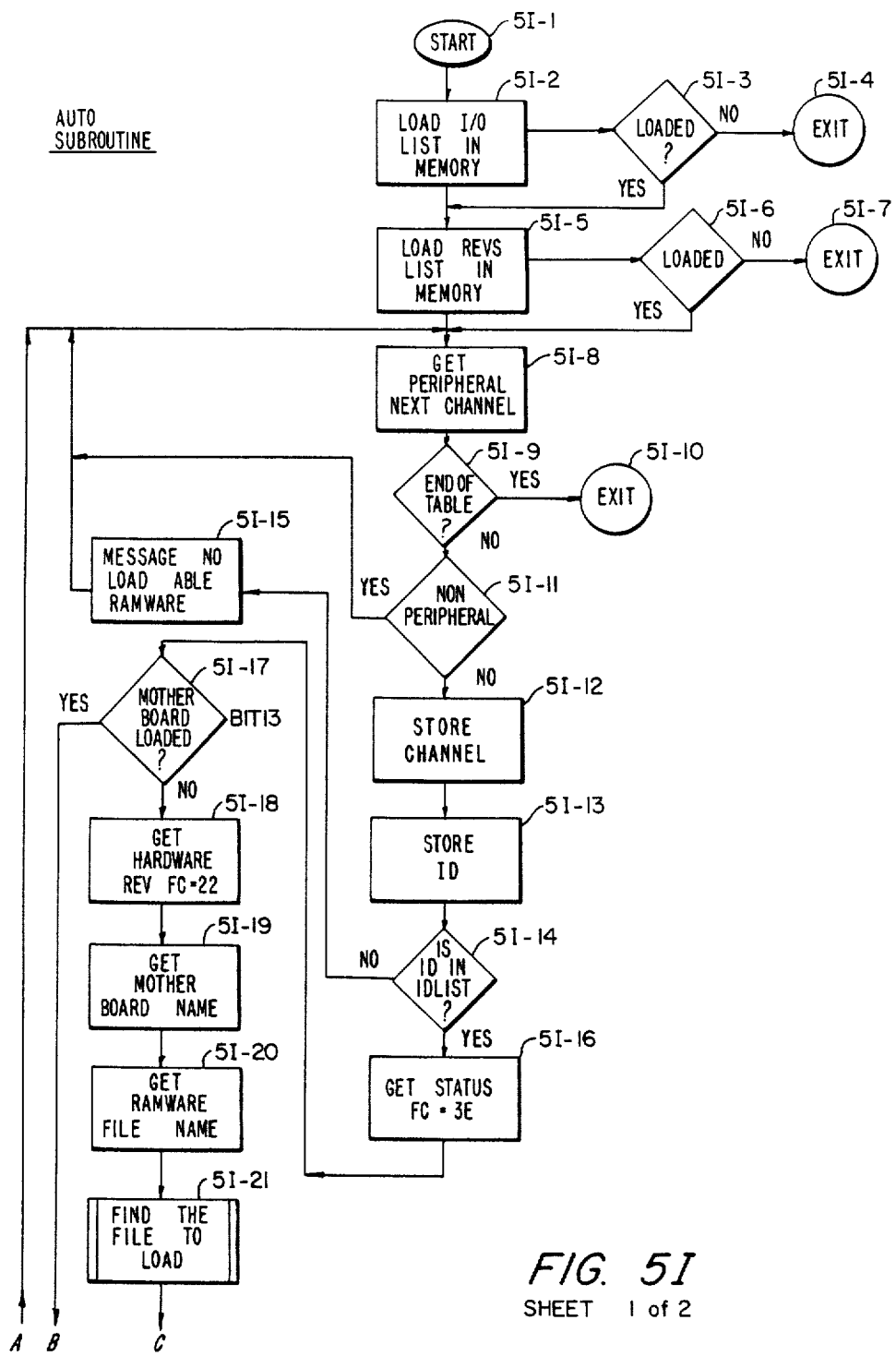

Referring now to FIGS. 2 and 5A, devices 213, 214, 215 attached to the UPC, through adapters 212, are software addressable via channel numbers. Each individual device has two channel numbers assigned, differing from each other only in the low order bit value (the direction bit). Channel assignments on the Megabus are made utilizing FIG. 5A. Bits 8-17 of the address bus are utilized to select the adapter channel Bits 8-13 are utilized for the most significant (MS) portion of the channel number; whereas bits 14-16 are utilized for the least significant (LS) portion. Bit 17 is the direction bit wherein a read (input) operation is performed when it is set to 0, and a write (output) operation is performed when it is set to 1.

Channel assignments are as follows:

| |
|---|
| Channel n |
| Channel n + 080 |
| Channel n + 100 |
| Channel n + 180 |
| Channel n + 200 |
| Channel n + 280 |
| Channel n + 300 |
| Channel n + 380 |

When an IOLD instruction (to be discussed infra) is issued to the UPC, the direction bit of the output address channel number specifies whether it is going to be an input or an output data transfer; for all other commands, the direction bit is ignored. Bits 8-17 (reference FIG. 5A) are assigned at system installation. Software visibility of the devices attached to the UPC is such that the devices are independent of each other; except that initiation of a command sequence addressed to one device may be stalled while the UPC is busy servicing another device on the same port but on a different channel.

Associated with each channel is a set of registers which are loaded by software and specify parameters required for attached device operation. In addition to the range and the address registers (FIGS. 6A-6D), used for DMA operation, there are configuration registers (FIGS. 6E-6F) which contain record location and identification information and a task register for command codes. To perform a specific operation software first loads the address, range and configuration registers. The task register is loaded last with a command to be performed which also triggers the UPC channel operation. Commands addressed to a not busy channel are always accepted, but execution may be delayed because another channel on the same port is in the process of data transfer.

Overview of Ramware Load

The procedure is invoked by the system management function (SMF) 200 on detection of Power On signal from the system power supply (not shown). After running self test diagnostics, the SMF loads the central subsystem (CSS) 203 operating firmware from a Ramware diskette or a system disk.

After loading the CSS Ramware and initiating its extended self diagnostics, the SMF loads and starts the bootstrap load of operating system which then invokes the Ramware load utility (discussed infra). The Ramware load utility routine scans I/O ID (input/output identification) numbers from #0000-#FFFF looking for controllers which 0 require Ramware loading. On detection of a number (#8000+ID) and after reading the Ramware Load Status, function code, FC=3E, (bits 13, 14 and 15=0) the software utility loads the UPC Ramware first in one, or multiple IOLD (see IOLD instruction infra) increments, of up to the full range value of 65K bytes, IOLD FC's=29 and 2D, until terminated by the Control Word "Stop Ramware Load" command FC=#01 and data #1000. The adapter Ramware is loaded next and the Ramware Load Status bits 13 (on all channels) and 14 (this channel) are set to ONE if the loading is successful; if not, at any IOLD step, bit 15 is set to ONE and the software utility, retries that failed IOLD one more time. If multiple channels on the UPC require the same Ramware load, these channels should have their Ramware Load Status bit 14 also set; this avoids loading multiple copies of the same Ramware.

Ramware Load Utility

In PROM 302 a base intelligence is maintained that interrogates the identification (ID) of the currently attached adapters and via Megabus request and response instructions (infra) and together with the SMF (system management facility) 200 seeks out from the bootload device the personality (Ramware) that corresponds with that specific adapter's ID. This Ramware will be loaded into the corresponding local DRAM 303 associated with the physical port of the adapter. If two or more ports have the same type adapter, the Ramware will be written into the corresponding RAM locations by cloning, thus reducing system configuration Briefly the Ramware load utility is as follows:
Load the I/O ID list from the load medium into memory
Load the revs list from the load medium into memory
Scan the ID entries for those requiring loadable peripheral Ramware
Match the ID with valid IDs found in the IDLIST
Determine if motherboard or adapter board Ramware is to be loaded
Get the board hardware revision
Using the board name and the hardware revision, determine Ramware to be loaded using IOREVS
Load Ramware file into memory
Prepare board for load sequence
Load Ramware from memory into RAM
Validate the loading sequence
Determine next load device or channel
Continue until all necessary Ramware is loaded
Exit to operation system Referring now to FIGS. 5H, 5I and 5J a detailed description of the load utility program to load the UPC controller will be given. The program starts at 5H-1. At 5H-2 the text file is loaded. This text file contains all the messages that are used by the utility load program and they are separated in a separate module to facilitate foreign language translation by affiliates.

The text file is stored on a load medium and is loaded into main memory 202 from the load medium. The load media may be a diskette not part of the UPC system, or it may be part of the UPC system, or still another load media such as a disk that is not part of the UPC load system. There is an internal check to determine whether this is an automatic load or a manual load at 5H-3. At 5H-5 if it is an automatic load, the load will continue automatically. 5H-4, 6, 7, 8, 9 and 10 are some of the internal debug utilities that are used where more help can be printed, a manual load can be achieved, or other debug purposes and is not necessary for the practice of this invention and accordingly will not be further considered.

Figure 5I:
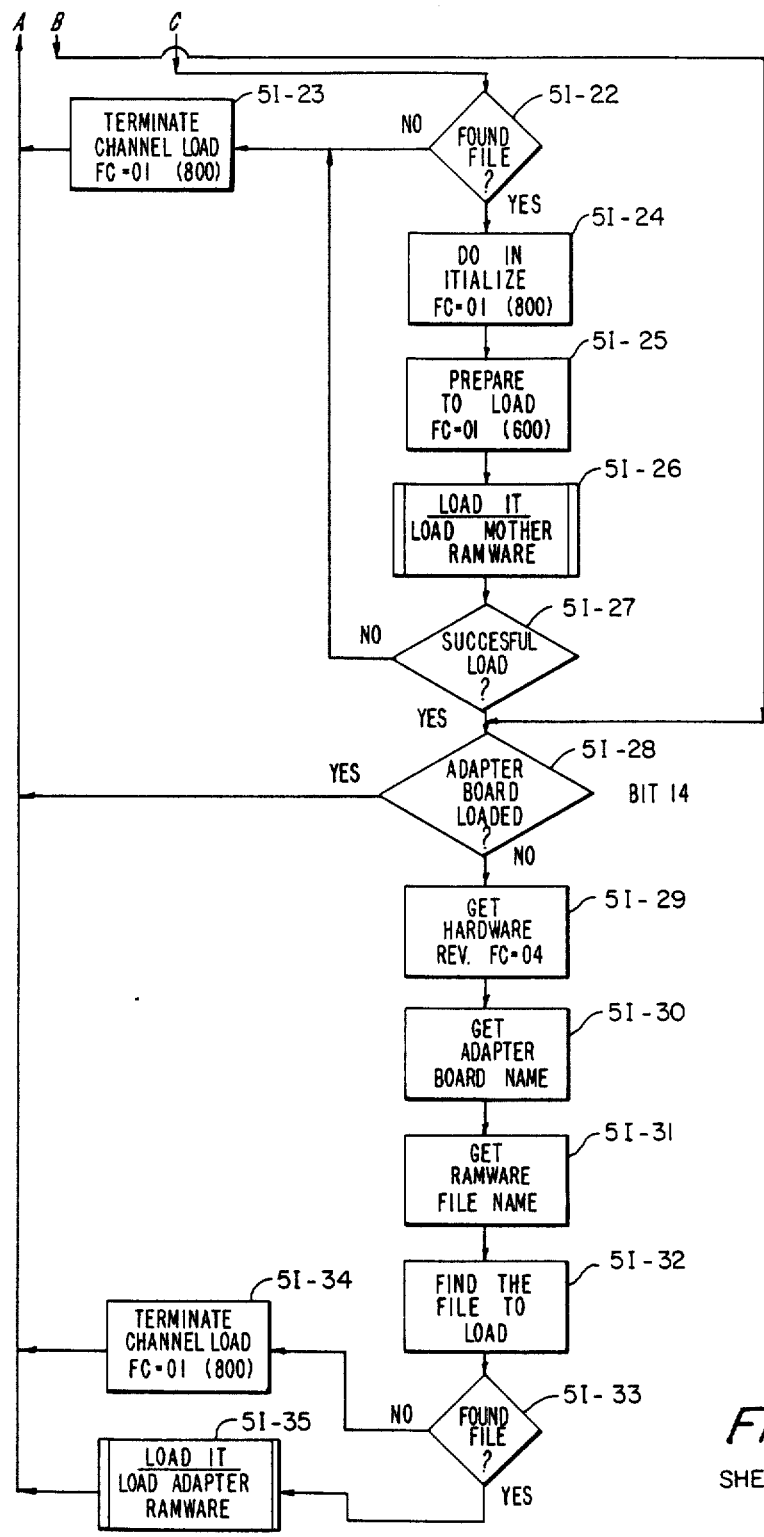

Continuing with the automatic load portion in finer detail with reference to FIG. 5I, the load process is started at 5I-1. At 5I-2 the file list, a separate input/output file called IDLIST is loaded into memory 202 from the load medium. There is a check at 5I-3 to determine if the load was successful and if not, the program exits at 5I-4. If the load is successful, at 5I-5 the revisions list (revs list which is named IOREVS) is loaded into memory 202 and another check at 5I-6 is made to determine if that load was successful.

If the load is not successful, the program will exit at 5I-7. If it is successful, it will continue to 5I-8 where the program will scan for peripheral channels on the system. It will do a bus scan. It will first check if its end of scan has been completed at 5I-9, and if it has, the program will exit at 5I-10. If the table has not been depleted, there will be a check at 5I-11 for peripheral or non-peripheral channels. If the channel is a non-peripheral channel, the program will go back to 5I-8 to get another channel to check for peripheral channels. When a peripheral channel is detected that channel will be stored at 5I-12. It will also store the identification ID of that channel at 5I-13. At 5I-14 there will be a comparison to check if the ID from the channel interrogated matches one of the IDs in the IDLIST. If there is no match for that ID and it is a channel that should be loaded with Ramware, an error message will be printed at 5I-15 that says no Ramware for that channel and the program will continue back to 5I-8 to get the next channel. If this channel that has been interrogated is matched with one of the ones in the IDLIST at 5I-14, 5I-16 it will get the status of that channel using a function code 3E. The result of that will interrogate bit 13 of that status word to determine if the motherboard (i.e. UPC) is loaded at 5I-17.

At 5I-18 if the motherboard is the board to be loaded and has not been loaded previously, the hardware rev is fetched using a function code 22 and is stored in memory 202.

At 5I-19 the motherboard name is taken out of IDLIST that is now loaded into main memory; the Ramware name for that appropriate ID is also taken at 5I-20. At 5I-21 using the information for the motherboard name and the Ramware file name and the hardware rev, the program will determine which Ramware file is to be loaded into memory. The board name and a Ramware rev are combined to form the Ramware file name. The board name may be either an adapter board name or a UPC board name, such as for example BF8UPC for the UPC and BH8UTA for a tape controller adapter.

In this first case it would be calling the UPC itself, because the UPC Ramware must be loaded first. In this first path from 5I-18, 19, 20, 21, the UPC board is being loaded into main memory 202.

The file to be loaded is determined and at 5I-22 there is a check to see if this file is present on the diskette or disk medium. If it is not, then at 5I-23, a command is sent to terminate the channel load, which is a function code of 01 with a data field of 800. This terminates the load on that channel since there is no Ramware to be found, and the program continues back to 5I-8 to get the next channel in the sequence. If the file is found at 5I-24, the controller is prepared to accept the Ramware load with an initialize via function code 01 with data 8000, and another command at 5I-25 is also given having a function code of 01, data field of 600, which prepares the UPC board to be loaded. At 5I-26 the actual load takes place. (See FIG. 5J for details on the actual load of the Ramware). At 5I-27 there is a check to determine if the load was successful. If the load is not successful, the program proceeds to 5I-23 to terminate the load on that channel, which then continues to 5I-8 to get the next channel. In the case of a successful load the program continues to 5I-28. There are two ways to arrive at 5I-28. One is to get there after a successful UPC motherboard load. The other is from 5I-17 which would have checked if the motherboard had been loaded, it would not be necessary to load the motherboard again; then the program continues to 5I-28 to load the adapter board only. At 5I-28 there is a check to see if the adapter board has been loaded or not, that checks bit 14 of the status word 3E. If the adapter board has been loaded, the program will continue to 5I-8 to get the next channel. If it has not been loaded, the program will continue to prepare to load this channel at 5I-29. The hardware rev is interrogated using a function code of 04 for the adapter at 5I-29. At 5I-30, the adapter board name is found from the IDLIST. At 5I-31 the Ramware file name to be loaded is picked up from the IDLIST. Using these pieces of information, the hardware rev, the adapter board name and the Ramware file name, at 5I-32 the program will determine which Ramware file to load and will load that one into main memory 202. At 5I-33 there will be a check to make sure that file was successfully loaded into memory. If it was not, at 5I-34 there would be a terminate channel load command of a function code 01 with an 800, and the program would continue back to 5I-8 to get the next channel. If this file is found at 5I-35 the adapter firmware would be loaded using the routine referenced in FIG. 5J.

Figure 5J:
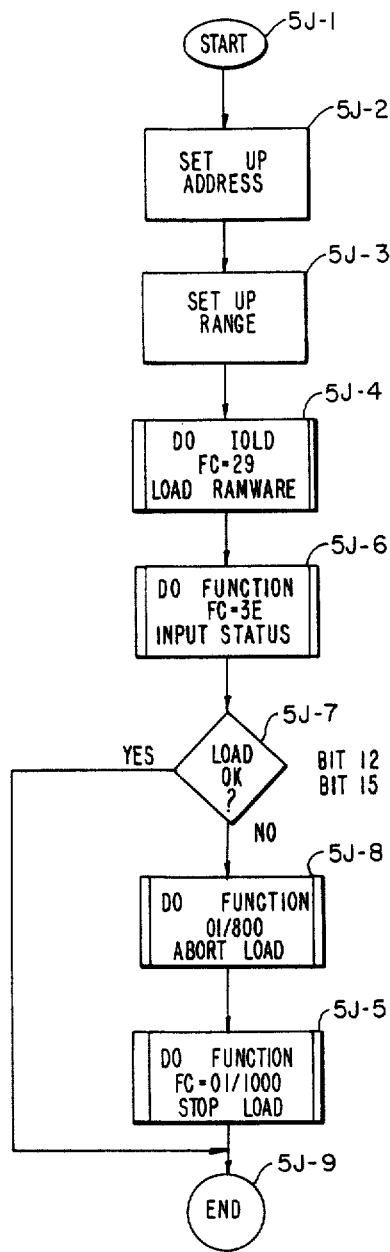
FIG. 5A is a format of the address bus.
FIGS. 5B-5C are formats of UPC memory write request.
FIGS. 5D-5E are formats of UPC memory read request.
FIGS. 5F-5G are formats for response cycle.

Referring now to FIG. 5J the actual load routine will be described. The program starts at 5J-1. At 5J-2 there is a set up of the address of the channel to be prepared for this load transfer. At 5J-3 the range of the transfer is set up. At 5J-4 an IOLD command (to be described infra) in the function code 29, initiates the actual load of the Ramware. At 5J-6 a function code 3E is used to input the status which is checked at 5J-7 The 3E status bits 12 and 15 are checked to determine if the load of the Ramware was successful. If the load was successful, we continue to 5J-9, which exits the program. If the load was unsuccessful, at 5J-8 there is function code of 01 with data 800 to terminate or abort the load process. At 5J-5 a function code 01 with data of 1000 is sent out to stop the load process initiated at 5J-4.

Table I below describes a typical IDLIST which is a file that contains the ID information, the mask, the adapter names and the mother names of the boards that will be loading the firmware.

TABLE I

| ID | MASK | ADAPTER | MOTHER |
|---|---|---|---|
| A000 — A007 | FFF8 | BD8NPB | BF8UPC-215 of FIG. 2 |
| A017 | FFFF | BD8UFD | BF8UPC-214 of FIG. 2 |
| A031 — A033 | FFFC | BD8NPB | BF8UPC-215 of FIG. 2 |
| A05A + A05F | FFFA | BH8UTA | BF8UPC-213 of FIG. 2 |
| A07E + A07F | FFFE | BD8UST | BF8UPC-214 of FIG. 2 |
| A0C4 | FFFF | BD8UPR | BF8UPC-215 of FIG. 2 |

A typical entry would have the ID of A000 which would have a mask of FFF8, meaning that different channels not only the A000 would be allowable for this adapter motherboard combination. The corresponding board name for that channel ID would be BD8NPB, which is a printer adapter and that printer adapter attached to the BF8UPC motherboard. The ID A000 with the adapter BD8NPB is referenced at 215a, 215b of FIG. 2. Another typical entry would be A017 with a mask of FFFF, that describes the adapter BD8UFD on the motherboard BF8UPC, that is referenced in 214 of FIG. 2. A030 with a mask of FFFC describes adapter BD8NPB of BF8UPC, that is referenced as 215a, 215b of FIG. 2. ID A05A with mask FFFA describes adapter BH8UTA of BF8UPC referenced at 213 of FIG. 2. ID A07E, mask FFFE, describes adapter BD8UST of BF8UPC, described in 213 of FIG. 2. And finally A0C4, with mask FFFF, describes adapter BD8UPR of BF8UPC, referenced at 215a, 215b of FIG. 2.

This IDLIST contains ID information, mask information, adapter name information and motherboard name information. The ID represents the unique identification to describe the board. When the board is interrogated and asked its ID, it will respond with a unique hex code that will enable software to determine what is present on a bus. In the case of using masks, in the first one A000, has a mask of FFF8. This allows a shorthand method of describing that IDs from A000 through A007 are allowed to describe the corresponding adapter motherboard combination. In the case of A030, which has a mask of FFFC, valid IDs for the corresponding adapter board would be A030 through A033. In the case of A05A, which a mask of FFFA, valid IDs for this are A05A and A05F. With A07E, with mask FFFE, valid IDs are A07E and A07F.

On Table II below there is a description of the IOREVS file. This IOREVS file contains a board name, the corresponding hardware revision and appropriate firmware revision. The board name is a six character name describing the board, for example UPC board BF8UPC. The valid hardware rev, possible for that board, is 00 (Ref Table II). When that board hardware rev of that board is determined, the appropriate firmware rev to be loaded is 00. If there were other valid firmware revs for this hardware rev, they would be continued on a line where hardware revs 00 may have valid Ramware revs of 01, 02, 03, as well as 00. There is also a case where you can have multiple hardware revs. In that case you may have an entry with hardware rev, for example 01, and corresponding appropriate Ramware revs of 01 and 02, as well as hardware rev 00 loading Ramware rev 00 or 01. Each board has a correponding table entry of valid hardware and valid Ramware revs to be loaded. BF8UPC is the UPC motherboard and the other adapters included in Table II would be BH8UTA, BD8NPB, BD8UFD, BH8UPR, BD8UST.

TABLE II

| | BF8UPC | |
|---|---|---|
| H/W | | F/W |
| 00 | | 00,FF |
| FF | | |
| | BH8UTA | |
| H/W | | F/W |
| 00 | | 00,FF |
| FF | | |
| | BD8NPB | |
| H/W | | F/W |
| 00 | | 00,FF |
| FF | | |
| | BD8UFD | |
| H/W | | F/W |
| 00 | | 00,FF |

TABLE II-continued

| | | |
|---|---|---|
| FF | | |
| | BH8UPR | |
| H/W | | F/W |
| 00 | | 00,FF |
| FF | | |
| | BD8UST | |
| H/W | | F/W |
| 00 | | 00,FF |
| FF | | |

Configuration and Simultaneity After the Ramware Load Utility

The UPC provides four levels of simultaneity (i.e. four data transfers can be active in the subsystem) and supports the following:

A not busy channel must accept instructions directed to it over the Megabus 204, 205 even though a data transfer is active within another channel.

For ports with more than one channel, any device control order received during a data transfer is initiated prior to the start of another data transfer.

Ports are serviced on a round-robin priority basis so that no port can dominate the controller. (See U.S. patent application entitled "DMA Controller Chip Sequencer", filed on even date with the instant application and assigned to the same assignee as the instant application.)

Channels not enabled or channels enabled but not operational respond with a negative acknowledge signal (NAK), busy signal, to both read and write requests.

UPC accepts data read/write commands to unbusy channels while busy channels are in the process of moving data but does not initiate a data transfer on a new channel until the port on which it resides completes its data transfer. If the UPC is configured with less than eight devices, it responds to channel numbers associated with the installed devices only; i.e. base channel number assignments can overlap in another UPC on o the same Megabus: example—UPC #1 channels 400, 480, 500 and 580 and UPC #2 channels 600, 680, 700 and 780.

The UPC recognizes a command transfer request on the Megabus when a valid channel number is decoded in bits 8–17 of the address bus. If the addressed channel is not busy, the contents of the data and address buses are stored in the channel interface and the UPC issues an ACK response (acknowledge) to the CSS to complete the bus cycle; now the UPC can process the information contained in the channel interface. If the addressed channel is busy executing a previously received command, the UPC completes the bus cycle by issuing a NAK response (negative acknowledge). If, however, the UPC is temporarily busy, processing a not interruptible function, it completes the bus cycle with a WAIT response which is followed by either an ACK or a NAK response when the function in process terminates.

Most data transfers associated with the UPC are executed in Direct Memory Access (DMA) mode, with a few exceptions, the Minidiskette adapter and data transfers of 3 bytes or less transfers data with firmware/Ramware. Data transfers are normally either word wide or double word wide.

Memory write data accesses are initiated by the write request shown on FIG. 5B. The address bus memory byte address occupies bits 0–23; where A–H shows the extended address option. The data bus is 32 bits wide with bytes 0, 1, 2 and 3 being addressed by bits 0-7, 8-15, 16-23 and 24-31 respectively.

Seven types of nonlocking write cycles are supported by the enhanced functionality of the extended Megabus controlled by the 23rd address bit (Y) and BSBYTE, BSDBPL and BSDBWD lines as shown on Table III below:

TABLE III

|   |   | (Y) | BSBYTE | BSDBPL | BSDBWD |
|---|---|---|---|---|---|
| o Byte 0 |   | 0 | 0 | 1 | 1 |
| o | Byte 1 | 1(set) | 0 | 1 | 1 |
| o Byte 0 & | Byte 1 | * x | 1 | 1 | 1 |
| o | Byte 1 & Byte 2 |   | 1 | 0 | 1 |
| o Byte 0 & | Byte 1 & Byte 2 | * x | 1 | 1 | 0 |
| o | Byte 1 & Byte 2 & Byte 3 |   | 1 | 0 | 0 (true) |
| o Byte 0 & | Byte 1 & Byte 2 & Byte 3 | * |  1 | 0 | 0 |

All of the above can occur at the start of a transfer with possible combinations marked * occurring at the transfer's end.

The first three are supported on the standard Megabus with the ability to write a byte from either the left-hand 204 or the right-hand 205 half of the data bus; bit lines BSDT00 through BSDT15. The remaining four requests are written from new data signals, bit lines BSDT16 through BSDT31, as well as the old lines with the data bits 0-15 being written into an address location and bits 16-31 being written into the next consecutive higher address location. UPC memory read requests are double width only. They have access to all 32 bits of data on the extended Megabus and are able to process one word, bytes 0 and 1, or two words, bytes 0-3, in each response cycle of the requesting UPC. Referring to FIG. 5B the format of the read request is shown. The address bus format of FIG. 5B is the same as that of FIG. 5A; however the data bus identifies the device channel number by utilizing bits 0-9; whereas the adapter register address into which the returned memory data is delivered is identified by utilizing bits 10-15. Bits 16-31 are reserved for future use (RFU) and must be 0 (MBZ).

Memory responds in the second half of the read cycle by placing on the address bus of FIG. 5D bits 18-23 the contents of the entire data bus as received by memory during the request cycle. On FIG. 5D bits A-H and 0-7 of the address bus, must be 0, and bits 8-17 identify the channel number. Bytes 0 and 1 of the data bus occupy bits 0-15, and bytes 2 and 3 occupy bit positions 16-31.

Referring now to FIGS. 6 and FIGS. 7 the various UPC and other instruction to load and determine Ramware status, etc., will be described.

After the Ramware is loaded, the UPC supports the following instructions listed in Table IV below.

TABLE IV

| Type | Function Code | Instruction | FIGS. |
|---|---|---|---|
| Output |   | IOLD: CSS Command | 6A, 6B, 6C, 6D |
|   | 09 | Address | 6A, 6B |
|   | 0D | Range | 6C, 6D |
|   |   | IOLD: SMF Ramware Load | 6A, 6B, 6C, 6D |
|   | 29 | Address | 6A, 6B |
|   | 2D | Range | 6C, 6D |
|   |   | IOLD: Bootload | 6A, 6B, 6C, 6D |

TABLE IV-continued

| Type | Function Code | Instruction | FIGS. |
|---|---|---|---|
|   | 39 | Address | 6A, 6B |
|   | 3D | Range | 6C, 6D |
|   | 11 | Configuration Word A |   |
|   | 13 | Configuration Word B | 6E, 6F |
|   | 15 | Configuration Word C |   |
|   | 17 | Configuration Word D |   |
|   | 01 | Control Word | 6G, 6H |
| Input | 08,28,38 | LSW Memory Byte Address | 6I, 6J, 6K, 6L |
|   | 0A,2A,3A | MSW Memory Byte Address | 6M, 6N, 6O, 6P |
|   | 0C,2C,3C | Range | 6Q, 6R, 6S, 6T |
|   | 10 | Configuration Word A |   |
|   | 12 | Configuration Word B | 6U, 6V, 6W, 6X |
|   | 14 | Configuration Word C |   |
|   | 16 | Configuration Word D |   |
|   | 26 | Identification Code |   |
|   | 3E | Ramware Load Status | 7A, 7B, 7C, 7D |
|   | 04 | Adapter R/W & H/W Revision | 7E, 7F, 7G, 7H |
|   | 22 | UPC R/W & H/W Revision | 7I, 7J, 7K, 7L |
|   | 24 | UPC Channel Configuration | 7M, 7N, 7O, 7P |
|   | 20 | Retry Counter |   |
| Diagnostic | Even Code | Read UPC Registers | 7Q |
|   | Odd Code | Write UPC Registers | 7Q |

IOLD (Refer to FIGS. 6A, 6B, 6C, 6D, FIG. 3 and FIG. 2)

The I/O Load (IOLD) instruction is transformed by the CSS 203 into the Output Address (FIGS. 6A, 6B) and Output Range (FIGS. 6C, 6D) instructions on the Megabus 204, 205. Each IOLD instruction results in an output address instruction followed by an output range instruction.

There are three unique IOLD instruction for:
DMA data transfer, memory parameters, having function codes IOLD '09 and '0D
SMF or a software routine Ramware Load command, having function code IOLD '29 and 2D, for controllers and adapters requiring Ramware
Bootload command, having function code IOLD '39 and 3D, to be used by new adapters not required to be compatible with presently available device identification ID's.

Figure 6A:
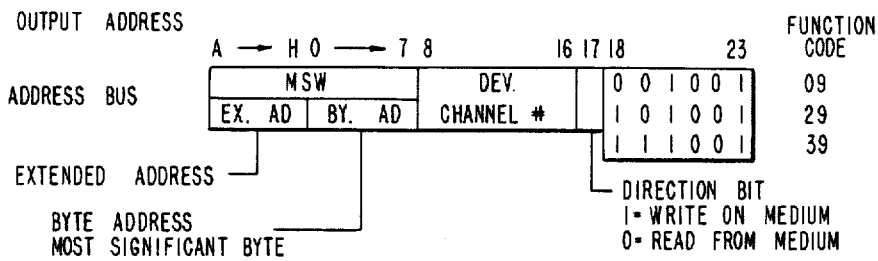
FIGS. 6A-6D show formats of the IOLD output instruction.
Figure 6B:

Output Address (FIGS. 6A, 6B)

Figure 6C:
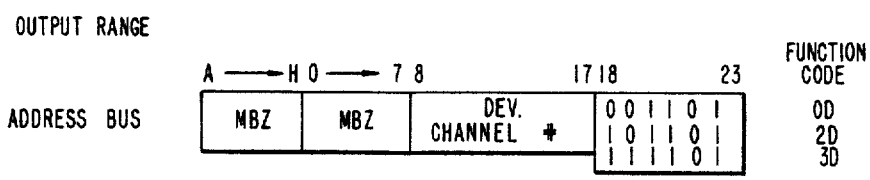

The IOLD, function code '09' and '0D', FIGS. 6A, 6C, loads a 24/32-bit address into the address register associated with the referenced channel (device). The address refers to the starting byte location in the main memory 202 where the UPC commences input or output data transfers. Bits A through H, FIG. 6A are the Extended Address (bits) and bits 0 through 7 are the most significant byte of the most significant word (MSW) of the 32 bit, double word, memory byte address. The least significant word (LSW), FIG. 6B, of the memory byte address is contained in the data bits 0 through 15. Data transfers to or from memory are normally either word wide or double word wide, dependent on the UPC position on the Megabus, but byte mode transfers can occur associated with the first and/or last memory cycle of a particular data transfer if the main memory buffer (identified by this instruction) begins or ends on an odd byte boundary.

Bit 17 of the address bus (direction bit of the channel number) determines the direction of any subsequent data transfer operation. A logical One specifies an output operation (writing on medium) while a logical Zero specifies an input operation (reading from medium).

IOLD function code '29' and '2D', FIGS. 6A, 6C, is intended for Ramware loading by the SMF/software during power-on system initialization and after reload command (FC=01).

IOLD function code '39 and '3D, FIGS. 6A, 6C, is used for initiating a bootstrap record load from a data storage device such as diskette, 413A, 411B, magnetic tape 408A-409A, 408B-409B, 400B, etc. The resident device Ramware positions an actuator to read the very first record of a storage medium and transfer it to main memory at the address specified in the instruction.

Figure 6D:

Output Range (FIGS. 6C, 6D)

IOLD function code '09' and '0D', FIGS. 6A, 6C, instruction loads the range register associated with the referenced channel. The unsigned, 16-bit, quantity loaded (data bus) is the number of bytes (range) to be transmitted during the data transfer that is being set up. The number is a positive binary quantity and is decremented by the UPC 201 after each memory transfer. The function code 0D is also a Go Function for printer adapters. A range of Zero results in a premature end-of-operation termination for any read or write command that may be subsequently issued. Any range register residue is applied to the next command unless reset by another IOLD instruction.

IOLD function code '29' and '2D', FIGS. 6A, 6C, is intended for Ramware load by the SMF/software during power-on system initialization and after reload command (FC=01). The '2D' function code triggers the Ramware load procedure within the UPC or the channel, dependent on the UPC status; this action continues for successive IOLD commands until terminated by the '01', stop I/O function code, FIGS. 6G, 6H and data #1000 command.

IOLD function code '39' and '3D', FIGS. 6A, 6C, is used for initiating a bootstrap record load from a data storage device with a fixed range, by the controller Ramware, dependent on the device from which the data is being requested. The '3D' function code triggers the bootstrap load procedure within the channel. The default range data word transferred with the instruction contains #0000 value when the command is initiated by the SMF/software but the word can contain device specific information when the command is modified from the system control panel which further defines how the data is to be accessed. In the latter case bit significance is defined by the controller EPS; i.e., for a disk device with both a fixed and a removable medium, the range word may be interpreted as a configuration word A.

Figure 6E:
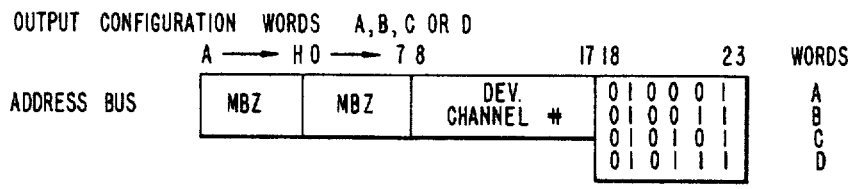
FIGS. 6E-6F show formats of output configuration words A, B, C or D.
Figure 6F:

Output Configuration Words A, B, C or D (FIGS. 6E, 6F)

This instruction loads Configuration Words A, B, C or D for the devices corresponding to the referenced channel. Parameters loaded are device specific indicated by bits 0-15 on FIG. 6F. Bits 8-17 identifies the device channel number; whereas bits A-H, 0-7 and 16-31 must be zero (MBZ).

Figure 6G:
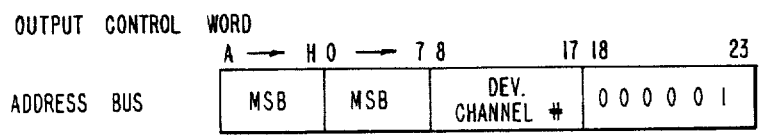
FIGS. 6G-6H show formats of the output control word.
Figure 6H:
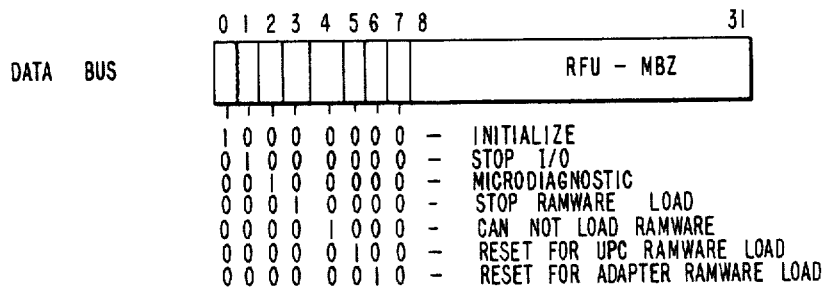
Figure 6I:
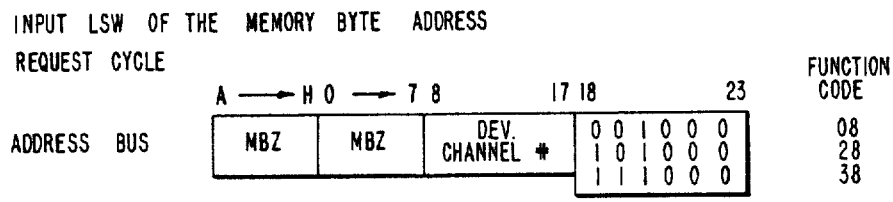
FIGS. 6I-6L show formats of input least significant words (LSW) of the memory byte address.
Figure 6J:
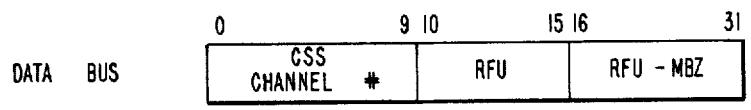

Output Control Word (FIGS. 6G, 6H)

Initialize (Function Code #01, #8000)

This instruction loads a control word, FIG. 6B, into the referenced channel. Bits A-H, 0-7 are the most significant bytes (MSB). Bits 8-17 identify the device channel number, and bits 18-23 are the function code bits. With function code 01, bits 18-23 of FIG. 6G, and bits 0-8 of FIG. 6A set to binary 8000, a command is invoked that causes the UPC to reset to the same state that it enters after the true power on, BSPWON (positive transition). There is no need to reload the operating Ramware. Another initialize command received on another channel on the UPC is accepted and executed like a new command since all of its channels are initialized, regardless of which channel the command is received over.

Operations that are in progress in the UPC at the time of the initialization are abruptly terminated and all software addressable registers are initialized. No information about the terminated operations are retained and no interrupts for the operations are generated. The interrupt level for all channels is set to Zero (interrupts blocked).

Stop I/O (Function Code #01, #4000)

This command causes any operation currently active on a specified channel to be abruptly terminated. If a data transfer operation is in progress, it is not completed and no error checking is done. An interrupt is generated (if interrupt level is not Zero) for the operation terminated by this command as if the operation ended normally. Status, address and range information, present in the UPC/channel when this command is received, is retained.

Microdiagnostics (Function Code #01, #2000)

This command causes the controller 204 and connected adapters 213 to perform extended QLT (EXQLT) diagnostics and on detection of a failure setting the QLTI byte to report a particular failing hardware identified by a unique bit pattern.

Stop Ramware Load (Function Code #01, #1000)

This command terminates a successive string of IOLD ('29' and '2D') instructions to the UPC or a channel indicating the end of a Ramware load. The UPC determines if all the channels have their Ramware loaded; if all channels are loaded, the UPC sets an appropriate status and executes Extended QLT's (EXQLT) as under Initialize above.

Cannot Load Ramware (Function Code #01, #8000)

This command terminates an unsuccessful attempt at loading Ramware into the UPC or an adapter by the SMF or software routine; it is unable to find the medium from which to load or it is unable to load appropriate Ramware revision (SMF or software defaults to the latest Ramware revision if not exact match is found). The most significant bit in the adapter ID or all UPC connected adapter ID's, if UPC cannot be loaded, must be reset, to allow the SMF or software to ignore that facility.

(01 #600)

Reset for UPC and adapter Ramware load. Reloads all Ramware.

Reset for UPC Ramware Load (Function Code #01, #0400)

This command should be preceded by an 'initialize' to terminate all UPC and adapter activity for no 'task' can be active on another channel during the reload procedure. Extended QLT's are run on the UPC and all connected adapters after the Ramware reload is complete. The command is not valid before Ramware is loaded.

Reset for Adapter Ramware Load (Function Code #01, #0200)

This command should be preceded by an 'initialize' to terminate all UPC and adapter activity for no 'task' can be active on another channel during the reload procedure. Extended QLT's are run on the UPC and all connected adapters after the Ramware reload is complete. The command is not valid before Ramware is loaded.

Input LSW of the Memory Byte Address (FIGS. 6I, 6J, 6K, 6L

This instruction causes the current contents of the referenced channel's memory byte address to be transferred to the requesting CSS channel. Bits A–H, 0–7, FIG. 6I, must be zero (MBZ). Bits 8–17 identify the device channel number; and bits 18–23 are the function code bits.

Figure 6K:
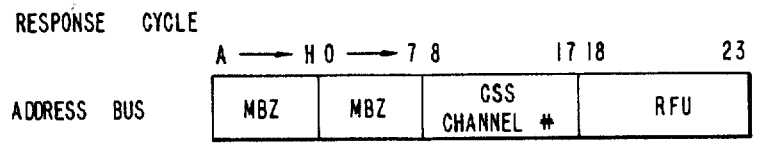
Figure 6L:
Figure 6M:
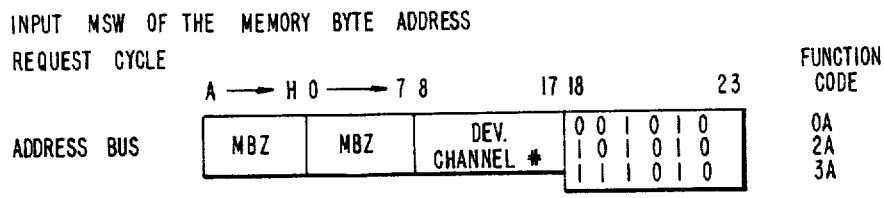
FIGS. 6M-6P show formats of input most significant words (MSW) of the memory byte address.
Figure 6N:
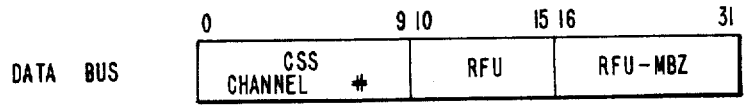
Figure 6O:
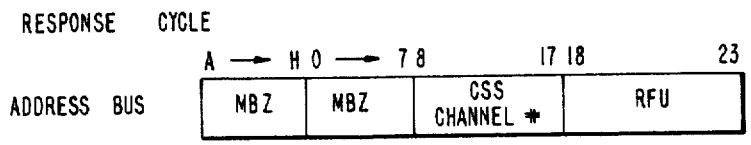
Figure 6P:
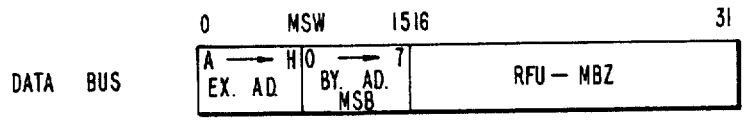
Figure 6U:
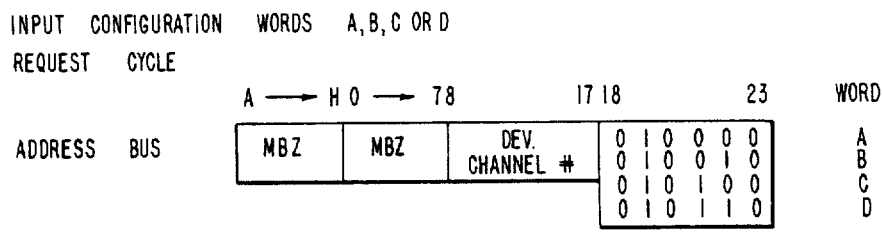
FIGS. 6U-6X show formats of input configuration words A, B, C or D.
Figure 6V:
Figure 6W:
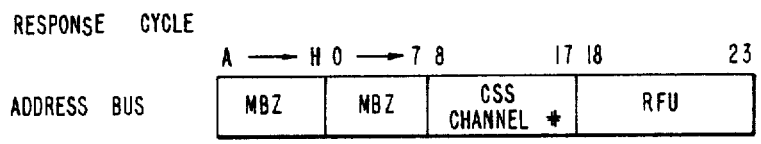
Figure 6X:
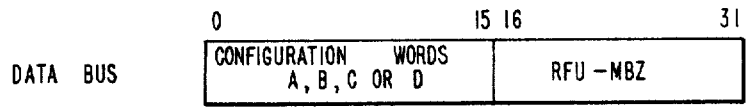

During the response cycle (FIGS. 6K, 6L, (second half read), the UPC returns, in bits 8 through 23 of the address bus, the same data that was received in bits 0 through 15 of the data bus during the request cycle. The data bus contains the Least Significant Word (LSW) of the Memory Byte Address currently stored for the specified channel in the UPC. FC=#08 reads an address loaded by the IOLD '09', FC=#28 reads an address loaded by the IOLD '29' and FC=#38 reads an address loaded by the IOLD '39'. Both IOLD's '29' and '39' trigger a specific action in a controller.

Input MSW of the Memory Byte Address (FIGS. 6M, 6N, 6O, 6P)

This instruction causes the current contents of the referenced channel's memory module address to be transferred to the requesting CSS channel.

During the response cycle (second half read), the UPC returns, in bits 8 through 23 of the address bus, the same data that was received in bits 0 through 15 of the data bus during the request cycle. The data bus contains the most significant word (MSW) 16 bits of the memory byte address, consisting of one byte of the extended address and one byte of the most significant byte (MSB) of the memory byte address, currently stored for the specified channel in the UPC. FC=#0A reads an address loaded by the IOLD '09', FC= #2A reads an address loaded by the IOLD '29' and FC#3A reads an address loaded by the IOLD '39'. Both IOLD's '29' and '39' trigger specific action in a controller.

Input Range (FIGS. 6Q, 6R, 6S, 6T)

This instruction causes the current contents of the referenced channel's rang register to be transferred to the requesting CSS channel.

During the response cycle (second half read), the UPC returns, in bits 8 through 23 of the address bus, the same data that was received in bits 0 through 15 of the data bus during the request cycle. FC=#0C reads an address loaded by the IOLD '09', FC=#2C reads an address loaded by the IOLD '29' and FC=#3C reads an address loaded by the IOLD '39'. Both IOLD's '29' and '39 trigger a specific action in the controller.

After completion of a data transfer operation, IOLD '09', the contents of the range register reflect the byte count of the data transferred:

If the content value is greater than zero, the length of the transfer was less than the original range.

If the content is zero, the length of the transfer was equal to or greater than the original range. cl Input Configuration Words A. B. C, or D (FIGS. 6U, 6V, 6W, 6X)

This instruction causes the current contents of the channel's Configuration Words A, B, C or D to be transferred to the requesting CSS channel. During the response cycle (second half read), the UPC returns, in bits 8 through 23 of the address bus, the same data that was received in bits 0 through 15 of the data bus during the request cycle.

Ramware Load Status (FIGS. 7A, 7B, 7C, 7D)

This instruction causes the referenced channel's Ramware Load Status to be transferred to the requesting CSS channel.

During the response cycle (second half read), the UPC returns, in bits 8 through 23 of the address bus, the same data that was received in bits 0 through 15 of the data bus during the request cycle.

Data Bus bit assignment:

| Data Bit | Description |
| --- | --- |
| 0 | Megabus Error Retry |
| 1 | Correctable Memory Error |
| 2 | UPC Ramware Restart |
| 3 | UPC Memory Error |
| 4 | Adapter Parity Error |
| 5 | Device Parity Error |
| 6 | IOLD '39' function not supported |
| 7 through 11 | RFU - MBZ |
| 12 | Unable to Load Ramware |
| 13 | UPC Ramware Loaded |
| 14 | Channel Ramware Loaded |
| 15 | Ramware Load Error |

Megabus Error Retry (Bit 0)

This bit is set whenever the UPC detects a parity error on any byte of the data, command or address during any bus cycle originated by the UPC on the first try.

This bit is reset by an Initialize command, next Task Word command, an Input Ramware Load Status command or Master Clear on the Megabus.

Correctable Memory Error (Bit 1)

This bit indicates that, during the previous data transfer operation, main memory detected and corrected a read error. The data delivered to the UPC is assumed to be correct.

This bit is reset by an Initialize command, next Task Word command, an Input Ramware Load Status command or Master Clear on the Megabus.

UPC Ramware Restart (Bit 2)

This bit is set upon detection of one of the conditions described below; the UPC Ramware is sent to the restart location and any data transfer, in process at the time, should be restarted.

Address error—a word reference has been made to a byte boundary.

UPC memory parity error—bit 19 (3) is also set.

Uninitialized interrupt vector—an interrupt was attempted to an uninitialized location in the vector table.

This bit is reset by an Initialize command, next Task Word command, an Input Ramware Load Status command or Master Clear on the Megabus.

UPC Memory Error (Bit 3)

This bit is set whenever the UPC detects a parity error on any byte of the local UPC memory (RAM) data.

This bit is reset by an Initialize command, next Task Word command, an Input Ramware Load Status command or Master Clear on the Megabus.

Adapter Parity Error (Bit 4)

When transferring data through an adapter to the device, parity is verified and if found in error this bit is set.

This bit is reset by an Initialize command, next Task Word command, an Input Ramware Load Status command or Master Clear on the Megabus.

Device Parity Error (Bit 5)

This bit is set on detection of a parity error in a data transferred between the UPC and an adapter This bit is reset by an Initialize command, next Task Word command, an Input Ramware Load Status command or Master Clear on the Megabus.

Function Not Supported (Bit 6)

This bit is set when an attempt is made by software to execute the Boot IOLD '39' command to an adapter not capable of responding properly.

This bit is reset by an Initialize command, next Task Word command, an Input Ramware Load Status command or Master Clear on the Megabus.

RFU-MBZ (Bits 7 through 11)

Reserved for future use and must be zero.

Unable to Load Ramware (Bit 12)

This bit, when set to one, indicates that the addressed channel Ramware cannot be loaded and that the channel ID is changed from '8000+ID' to ID to enable the SMF to ignore that UPC (and all of its channels) or a channel in system configuration.

This bit is reset by the true Power On or by the reload command.

UPC Ramware Loaded (Bit 13)

This bit, when set to one, indicates that the UPC motherboard Ramware is loaded correctly.

This bit is reset by the true Power On or by the reload command.

Channel Ramware Loaded (Bit 14)

This bit, when set to one, indicates that the addressed channel Ramware is loaded correctly.

This bit is reset by the true Power On or by the reload command.

Ramware Load Error (Bit 15)

This bit, when set to one, indicates that the Ramware just loaded was in error. The error condition is an OR function of the UPC and Megabus (Status Word 1 bits 13, 14 and 15) syndrome that would prevent proper operation.

This bit is reset by an Initialize command, next Task Word command, an Input Ramware Load Status command or Master Clear on the Megabus.

Input Adapter Ramware/Hardware Revision (FIGS. 7E, 7F, 7G, 7H)

The adapter Ramware revision level is represented by a hex number, e.g. 0C, which is the sequential control number loaded during the execute QLT command after the Ramware Load. Adapter hardware revision level is obtained from the PROM 302 or a set of jumpers which is updated with every hardware change on the adapter The revision level is to be available to the SMF or a software routine for Ramware Load procedure. The Address bus and Data bus of the request cycle perform similar type functions as FIGS. 6I, 6J except that the function code bits 18-23 are different.

Figure 7A:
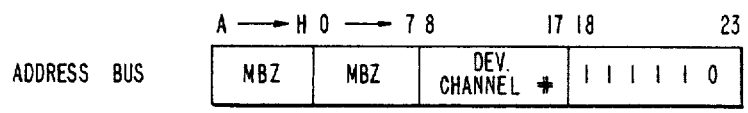
FIGS. 7A-7D show formats of Ramware Load Status words.
Figure 7B:
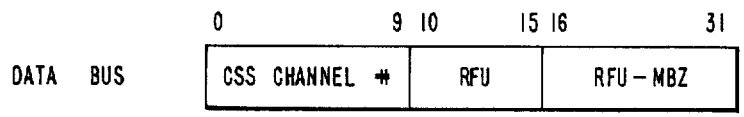
Figure 7C:
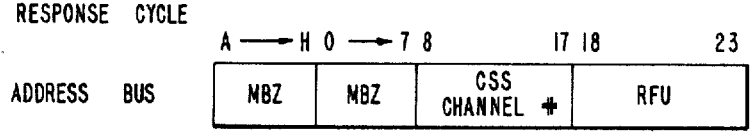
Figure 7D:
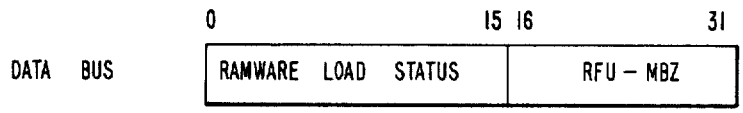
Figure 7E:
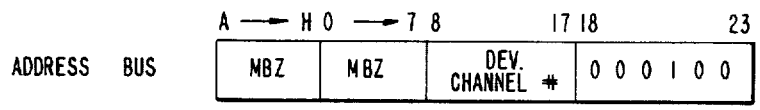
FIGS. 7E-7H show formats of input adapter Ramware/hardware receiving words.
Figure 7F:
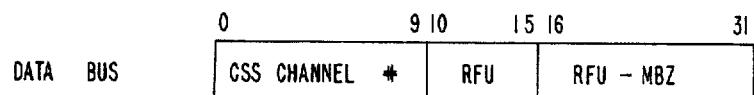
Figure 7G:
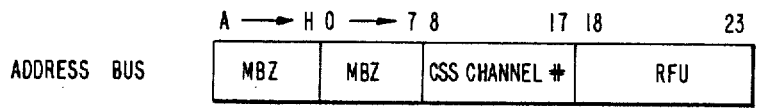
Figure 7H:
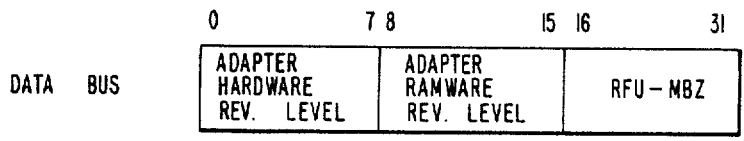

The address bus of response cycle FIG. 7G is similar to FIGS. 6K, 60. The data bus FIG. 7H has the adapter hardware revision level at bits 0-7, 8-15; whereas bits 16-31 are reserved for future use (RFU) and must be zero (MBZ).

Input UPC Ramware/Hardware Revision (FIGS. 7I, 7J, 7K, 7L)

Figure 7I:
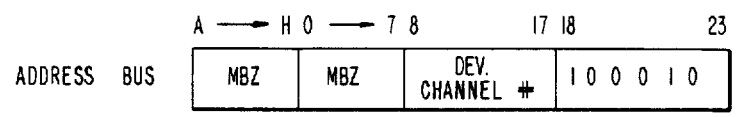
FIGS. 7I-7L show additional formats of input adapter Ramware/hardware revision words.

The UPC Ramware revision level is represented by a hex number, e g. 0D, which is the sequential control number loaded during the EXQLT command after the Ramware Load UPC hardware revision level is obtained from an EPROM or a set of jumpers which is updated with every hardware change on the UPC. The revision level is available to the SMF or a software routine for Ramware Load procedure. FIGS. 7I, 7J, 7K, 7L are similar to FIGS. 7E, 7F, 7G, 7H, except that bits 18-23 FIG. 7I are different than the bits 18-23 of 7E, but perform a similar function of identifying the function code FC for both instructions.

Input Channel Configuration (FIGS. 7M, 7N, 70, 7P)

Figure 7J:
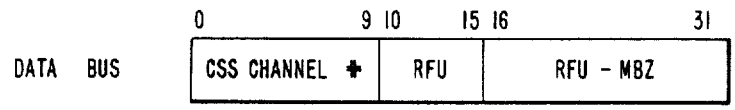
Figure 7K:
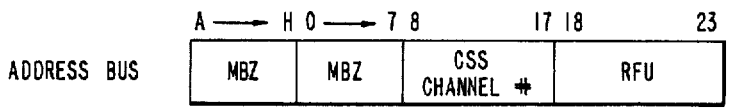
Figure 7L:
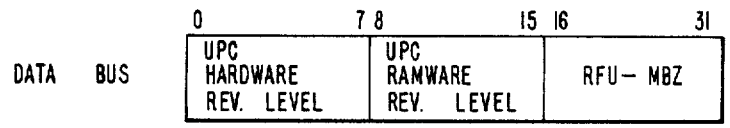
Figure 7M:
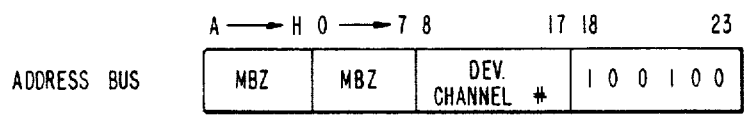
FIGS. 7M-7P show formats of input channel configuration words.
Figure 7N:
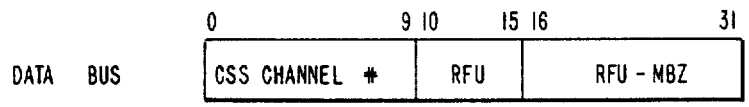
Figure 7O:
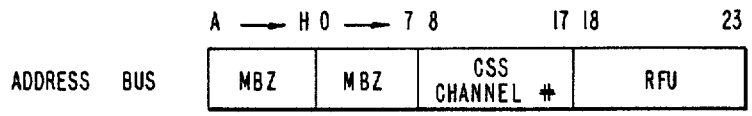
Figure 7P:
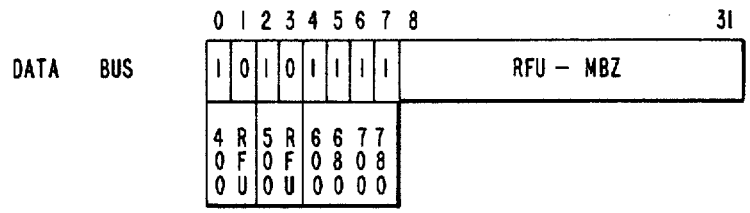

FIGS. 7M, 7N, 7O are similar to FIGS. 7I, 7J, 7K. The UPC channel configuration, available on the base channel only, FIG. 7P, appears as a series of 1's signifying an active channel an 0's signifying an inactive channel. When a read command, FC='24', is issued to a channel configured on this controller other than the base channel, a value of all 0's is returned. This allows software to distinguish between sequential/interleaved channel number assignments on multiple controllers. This command is expected to occur during system initialization and on power-up sequence only.

Figure 7Q:
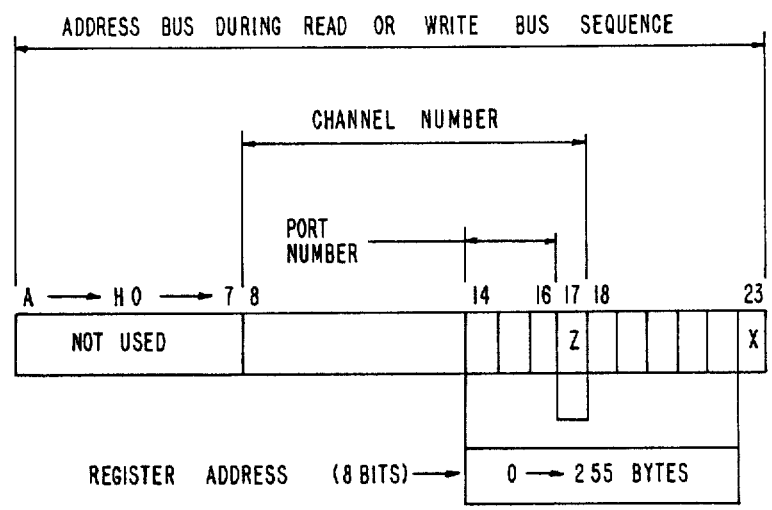
FIG. 7Q show format of UPC read/write registers.

Read/Write UPC Registers (FIG. 7Q)

The UPC maintains 32 registers (16 bits per register) for each channel. The address of each of the various registers in the UPC is a combination of 3 bits of the Channel Number and the high order five bits of the Function Code used to write into or read from a particular register (see Table I). For example, Configuration Word A for UPC channel 2 is UPC register 48 (hex):

Function code for configuration word A=01000X (X=read/write bit)

Channel number=010Z (Z=direction bit)

Register number=0100, 1000=48 (hex)

Complete software visibility to the UPC registers is provided for diagnostic purposes. An output bus sequence addressed to one of the devices causes the information on the data bus (16 bits) to be loaded into the device specific register specified by the device port number and the high order 5 bits of the function code, FIG. 7Q.

The Output Address command is a special case. When an Output Address command is executed (on port 0, for example) the UPC register 04 (hex) is loaded with the low order 16 bits of the address. The high order 16 bits of the UPC register 05 are loaded with the high order 16 bits of the address. Any input bus sequence addressed to a device causes the register specified by bits 14, 15 and 16 and the high order 5 bits of the Function Code to be returned via the data bus (during the half read cycle).

Appendix A available in the application file, is typical Ramware for adapter 1. Ramware for other adapters are similar except for minor details.

While the invention has been particularly shown and described with reference to a preferred embodiment thereof, it will be understood by those skilled in the art that the foregoing and other changes in form and details may be made therein without departing from the spirit and scope of the invention.

Having described the invention, what is claimed as new and novel for which it is desired to secure Letters Patent is:

1. A computer peripheral controller system having at least a system bus, at least a control subsystem (CSS), said CSS also including an erasable programmable memory (EPROM), and at least one random access memory (RAM) all coupled to the system bus, said computer peripheral controller system for controlling different types of peripheral devices (e.g. tape drives, disk drives, diskette drives, unit record drives, printers, etc.) coupled to said system bus, said peripheral computer system controller comprising:
   (a) adapter means coupled to said computer peripheral controller for coupling said peripheral devices to said system bus;
   (b) processor means coupled to said computer peripheral controller for controlling access to said system bus;
   (c) Ramware means in one of said peripheral devices for providing at least one configuration of peripheral devices for coupling to said system bus, from a plurality of configurations of peripheral devices capable of being coupled to said system bus;
   (d) utility loading means for automatically loading said Ramware means from one of said peripheral devices into said RAM; and,
   (e) instruction means in said computer peripheral controller system for servicing said configuration of peripheral devices coupled to said system bus.

2. The computer peripheral controller system as recited in claim 1 wherein said instruction means includes IOLD function code means for identifying addresses for data transfers into or from said RAM.

3. The computer system as recited in claim 2 wherein said instruction means includes stop Ramware load instruction means for terminating the loading of said Ramware means.

4. A computer system comprising a central processor and peripheral device coupled to a system bus and further comprising a universal peripheral controlled (UPC) coupled between the bus and a plurality of peripheral devices, the UPC having a plurality of communication channels, for coupling a peripheral device and the system bus, a processing unit for controlling communication through the communication channels and random access memory having locations associated with respective channels for storing software required by the processing unit for controlling communications through the channels, the system further comprising means for scanning identifiers associated with peripheral devices coupled to the channels and, responsive to the identifiers, storing in the respective locations in random access memory software specific to the peripheral devices required for control of communications with the peripheral devices through the channels, such that the UPC is able to control access to the system bus of different peripheral devices coupled to the UPC in different configurations.

5. A computer system as claimed in claim 4 including, in the UPC, adapters for coupling the UPC to the peripheral devices.

6. A computer system as claimed in claim 5 wherein each adapter is specific to each associated peripheral device and the UPC maintains a base intelligence for interrogating each adapter for the identifier to control access of the peripheral device to the system bus.

7. A computer system as claimed in claim 5 wherein the system comprises means for loading the software from a peripheral device coupled to one of the channels of the UPC.

8. A computer system as claimed in claim 7 including utility loading means for automatically loading the software from a predetermine peripheral device coupled to a channel of the UPC.

9. A computer system as claimed in claim 8 including, in the UPC, instruction means for servicing the peripheral devices.

10. A computer system as claimed in claim 9 wherein the system bus comprises a high priority, low data rate section and a low priority, high data rate section and wherein the UPC can service either section.

11. A computer system as claimed in claim 10 wherein each adapter includes at least two channels for coupling peripheral devices to the adapter.

12. A computer system as claimed in claim 9 wherein the instruction means includes IOLD function code means for providing addresses for data transfers into and from the random access memory in the UPC.

13. A computer system as claimed in claim 12 including configuration words corresponding to predetermined ones of the channels and wherein the instruction means further includes configuration word means for loading any of configuration words into random access memory in the UPC.

14. A computer system as claimed in claim 13 wherein the instructions means includes stop load instruction means for terminating a string of the IOLD instructions.

15. A computer system as claimed in claim 1 wherein the communication channels include respective direct memory access channels.

* * * * *